(12) United States Patent
You et al.

(10) Patent No.: US 11,874,465 B2
(45) Date of Patent: Jan. 16, 2024

(54) HEAD-UP DISPLAY SYSTEM

(71) Applicant: SAMSUNG ELECTRONICS CO., LTD., Suwon-si (KR)

(72) Inventors: Jangwoo You, Seoul (KR); Wontaek Seo, Yongin-si (KR); Daeho Yang, Suwon-si (KR); Changkun Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 481 days.

(21) Appl. No.: 17/095,451

(22) Filed: Nov. 11, 2020

(65) Prior Publication Data
US 2021/0382304 A1 Dec. 9, 2021

(30) Foreign Application Priority Data

Jun. 8, 2020 (KR) .................. 10-2020-0069094

(51) Int. Cl.
G02B 27/01 (2006.01)
G02B 27/28 (2006.01)
(Continued)

(52) U.S. Cl.
CPC .......... G02B 27/0103 (2013.01); B60K 35/00 (2013.01); G02B 3/00 (2013.01);
(Continued)

(58) Field of Classification Search
CPC ........ G02B 27/0103; G02B 3/00; G02B 5/10; G02B 5/3083; G02B 27/0093;
(Continued)

(56) References Cited

U.S. PATENT DOCUMENTS

| 10,613,331 B2 | 4/2020 | Moore et al. |
| 2019/0206362 A1 | 7/2019 | Li |
| 2019/0317325 A1 | 10/2019 | Malinovskaya et al. |

FOREIGN PATENT DOCUMENTS

| JP | 2014-10418 A | 1/2014 |
| JP | 2018-507442 A | 3/2018 |
| KR | 10-2002-0016063 A | 3/2002 |

OTHER PUBLICATIONS

Qin et al., "Dual-focal-plane augmented reality head-up display using a single picture generation unit and a single freeform mirror," Applied Optics, vol. 58, No. 20, Jul. 2019, Total 9 pages.
(Continued)

Primary Examiner — Joseph P Martinez
Assistant Examiner — Grant A Gagnon
(74) Attorney, Agent, or Firm — Sughrue Mion, PLLC

(57) ABSTRACT

A head-up display system includes an image generating apparatus configured to emit light having a first polarization and including image information; a polarization beam splitter provided on an optical path of the light having the first polarization and configured to transmit the light having the first polarization; a wave plate configured to transmit the light transmitted through the polarization beam splitter while changing a phase of the light; and a mirror configured to reflect the light sequentially transmitted through the polarization beam splitter and the wave plate back to the polarization beam splitter through the wave plate. The polarization beam splitter may reflect light having a second polarization that is different from the first polarization and obtained by transmitting the light reflected by the mirror back through the wave plate.

35 Claims, 14 Drawing Sheets

(51) Int. Cl.
*G02B 5/30* (2006.01)
*G02B 5/10* (2006.01)
*G02B 3/00* (2006.01)
*G02B 27/00* (2006.01)
*B60K 35/00* (2006.01)

(52) U.S. Cl.
CPC ............. *G02B 5/10* (2013.01); *G02B 5/3083* (2013.01); *G02B 27/0093* (2013.01); *G02B 27/283* (2013.01); *B60K 2370/1529* (2019.05); *B60K 2370/21* (2019.05); *B60K 2370/29* (2019.05); *B60K 2370/31* (2019.05); *B60K 2370/332* (2019.05); *B60K 2370/333* (2019.05); *B60K 2370/347* (2019.05); *B60K 2370/785* (2019.05); *G02B 2003/0093* (2013.01); *G02B 2027/014* (2013.01)

(58) Field of Classification Search
CPC .......... G02B 27/283; G02B 2003/0093; G02B 2027/014; B60K 35/00; B60K 2370/1529; B60K 2370/31; B60K 2370/29; B60K 2370/332; B60K 2370/21; B60K 2370/333; B60K 2370/347; B60K 2370/785; B60K 2003/0093; B60K 2027/014
USPC .......................................................... 359/13
See application file for complete search history.

(56) References Cited

OTHER PUBLICATIONS

Martin et al., "DLP® Technology: Solar loading in augmented reality head-up display systems," Texas Instruments, White Paper DLPA096, Jul. 2018, Total 16 pages.

HEAD-UP DISPLAY SYSTEM

CROSS-REFERENCE TO RELATED APPLICATION

This application claims priority to Korean Patent Application No. 10-2020-0069094, filed on Jun. 8, 2020, in the Korean Intellectual Property Office, the disclosure of which is incorporated by reference herein in its entirety.

BACKGROUND

1. Field

Example embodiments of the present disclosure relate to a head-up display system, and more particularly, to a head-up display system including a beam splitter.

2. Description of Related Art

A head-up display system for a vehicle, which is capable of effectively providing information to a driver in a vehicle, has been researched and developed. The head-up display system may display and provide a vehicle's driving speed, fuel efficiency, and engine status, and may also provide navigation information guiding a driver along the road on which the vehicle is traveling. The head-up display is a display device that displays driving information to a driver by overlapping the driving information on a front view through a windshield or a combiner.

Typical optical parameters to indicate the performance of the head-up display include an angle of view and a virtual image distance (VID). Generally, the angle of view of the head-up display is about 5 degrees to about 6 degrees, and the VID is about 2 m to about 3 m. In order to provide the driver with driving information in a wider field of view and with a virtual image matching a position of a real focal point, it may be necessary that the angle of view is 10 degrees or more and the VID is 7 m or more.

Combiner head-up displays provide a virtual image to a driver through a combiner provided at a position lower than the driver's gaze. Accordingly, the combiner head-up display may not provide a virtual image without disturbing the driver's gaze.

Windshield head-up displays may provide a virtual image at a position that minimizes the driver's gaze movement. However, the shape of the windshield of a vehicle on which a virtual image is provided causes various aberrations such as astigmatism and distortion, and it is not easy to correct the aberrations through an optical design. The windshield head-up display includes an aspherical mirror or a freeform curved mirror to minimize such various aberrations. The angle of view of this type of windshield head-up display is about 5 degrees to about 6 degrees. When the size of the aspherical mirror or the freeform curved mirror is increased to increase the angle of view of the windshield head-up display, the entire volume of the windshield head-up display system may increase, and the aberration may increase. In addition, a large aspherical mirror or freeform curved mirror may be easily deformed in the manufacturing process, and technical evaluation of such shape deformation may be difficult.

SUMMARY

According to one or more example embodiments of the present disclosure, a miniaturized head-up display system with increased angle of view and VID may be provided.

Additional aspects will be set forth in part in the description which follows and, in part, will be apparent from the description, or may be learned by practice of the presented embodiments of the disclosure.

In accordance with an aspect of an example embodiment, a head-up display system includes an image generating apparatus configured to emit light having a first polarization and including image information; a polarization beam splitter provided on an optical path of the light having the first polarization, the polarization beam splitter being configured to transmit the light having the first polarization emitted by the image generating apparatus; a wave plate configured to transmit the light transmitted through the polarization beam splitter while changing a phase of the light; and a mirror configured to reflect the light sequentially transmitted through the polarization beam splitter and the wave plate back to the polarization beam splitter through the wave plate, wherein the polarization beam splitter is configured to reflect light having a second polarization different from the first polarization, the light having the second polarization being generated when the light reflected by the mirror is transmitted back to the polarization beam splitter through the wave plate.

The mirror may include a concave mirror.

The head-up display system may further include a convex lens comprising an incident surface on which the light sequentially transmitted through the polarization beam splitter and the wave plate is incident, the convex lens being provided between the mirror and the wave plate and configured to refract the light incident on the incident surface.

The mirror may have a shape corresponding to a shape of one surface of the convex lens opposite to the incident surface, and the mirror may be formed integrally with the convex lens and in contact with the one surface of the convex lens.

The image generating apparatus may be configured to form an image between the mirror and a focal point of the mirror.

The mirror may include a spherical mirror.

The mirror may include any one of an aspherical mirror and a freeform curved mirror.

The wave plate may include a quarter wave plate.

A polarization axis of the first polarization and a polarization axis of the second polarization may be perpendicular to each other.

The polarization beam splitter may be rotatable.

The image generating apparatus may include a first image generating apparatus configured to generate a left eye image and a second image generating apparatus configured to generate a right eye image.

The head-up display system may further include a sensor configured to track a position of a user's eyes.

The head-up display system may further include a processor configured to control movement of the image generating apparatus based on the position of the user's eyes obtained through the sensor.

In accordance with an aspect of an example embodiment, a head-up display system includes an image generating apparatus configured to emit light having a first polarization and including image information; a first polarization beam splitter provided on an optical path of the light having the first polarization and configured to reflect the light having the first polarization; a first wave plate configured to transmit the light reflected by the first polarization beam splitter while changing a phase of the light; a first mirror configured to reflect the light transmitted through the first wave plate back to the first polarization beam splitter through the first wave plate; a second wave plate spaced apart from the first wave plate with the first polarization beam splitter therebetween, the second wave plate being configured to transmit the light reflected by the first mirror and sequentially transmitted through the first wave plate and the first polarization beam splitter while changing the phase of the light; and a second mirror configured to reflect the light sequentially transmitted through the first polarization beam splitter and the second wave plate back to the first polarization beam splitter through the second wave plate, wherein the first polarization beam splitter is configured to reflect the light transmitted back through the second wave plate.

The second mirror may include a concave mirror.

The head-up display system may further include a convex lens comprising an incident surface on which the light sequentially transmitted through the first polarization beam splitter and the second wave plate is incident, the convex lens being provided between the second mirror and the second wave plate and configured to refract the light incident on the incident surface.

The second mirror may have a shape corresponding to a shape of one surface of the convex lens opposite to the incident surface, and the second mirror may be formed integrally with the convex lens and in contact with the one surface of the convex lens.

The image generating apparatus may be configured to form an image between the second mirror and a focal point of the second mirror.

The light reflected by the first mirror and then transmitted back to the first polarization beam splitter through the first wave plate may include light having a second polarization different from the first polarization, and the light reflected by the second mirror and then transmitted back to the first polarization beam splitter through the second wave plate may include the light having the first polarization.

The first wave plate may include a first quarter wave plate and the second wave plate includes a second quarter wave plate.

The head-up display system may include a third mirror configured to reflect the light emitted from the image generating apparatus to the first polarization beam splitter.

The head-up display system may include a second polarization beam splitter that is provided between the first polarization beam splitter and the first wave plate, the second polarization beam splitter being configured to reflect the light emitted from the image generating apparatus to the first wave plate.

The first polarization beam splitter may be rotatable and the second polarization beam splitter may be fixed.

In accordance with an aspect of an example embodiment, a head-up display system includes an image generating apparatus configured to emit light having a first polarization and including image information; a beam splitter provided on an optical path of the light having the first polarization, the beam splitter being configured to reflect a portion of the light having the first polarization in a first direction and transmit the remaining portion of the light having the first polarization in a second direction different from the first direction; a wave plate configured to transmit the light reflected in the first direction by the beam splitter while changing a phase of the light; a first mirror configured to reflect the light transmitted through the wave plate back to the beam splitter through the wave plate; a second mirror spaced apart from the first mirror with the beam splitter therebetween, the second mirror being configured to reflect back, toward the beam splitter, the light reflected by the first mirror and sequentially transmitted through the wave plate and the beam splitter; and a polarizer configured to block the light having the first polarization transmitted through the beam splitter and traveling in the second direction, wherein the beam splitter is configured to reflect the light reflected by the second mirror, and wherein the polarizer is configured to transmit the light sequentially reflected by the second mirror and the beam splitter.

The second mirror may include a concave mirror.

The head-up display system may further include a convex lens including an incident surface on which the light sequentially transmitted through the wave plate and the beam splitter is incident, the convex lens being provided between the second mirror and the wave plate and configured to refract the light incident on the incident surface.

The second mirror may have a shape corresponding to a shape of one surface of the convex lens opposite to the incident surface, and the second mirror may be formed integrally with the convex lens and in contact with the one surface of the convex lens.

The image generating apparatus may include a display panel configured to generate the light including the image information; and an optical system configured to diffuse the light generated from the display panel.

The display panel may include any one of a liquid crystal on silicon (LCoS), a digital micromirror display (DMD) and a liquid crystal display (LCD) panel.

The optical system may include a plurality of lenses.

The optical system may further include an aperture provided between a first lens and a second lens of the plurality of lenses, the aperture being configured to block a portion of the light emitted from the display panel.

The aperture may be configured to block light emitted from a surface of the display panel in a direction perpendicular to the surface of the display panel.

The aperture may include a dot-shaped blocking film at a center thereof configured to block light converging to the center of the aperture from the plurality of lenses.

The display panel may be configured to generate a computer generated hologram (CGH).

The optical system may further include a plurality of lenses; and an aperture provided between a first lens and a second lens of the plurality of lenses, the aperture being configured to block a portion of the light emitted from the display panel, wherein the aperture includes an opening provided at a point where primary diffracted light from among light emitted from the display panel converges from the plurality of lenses.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
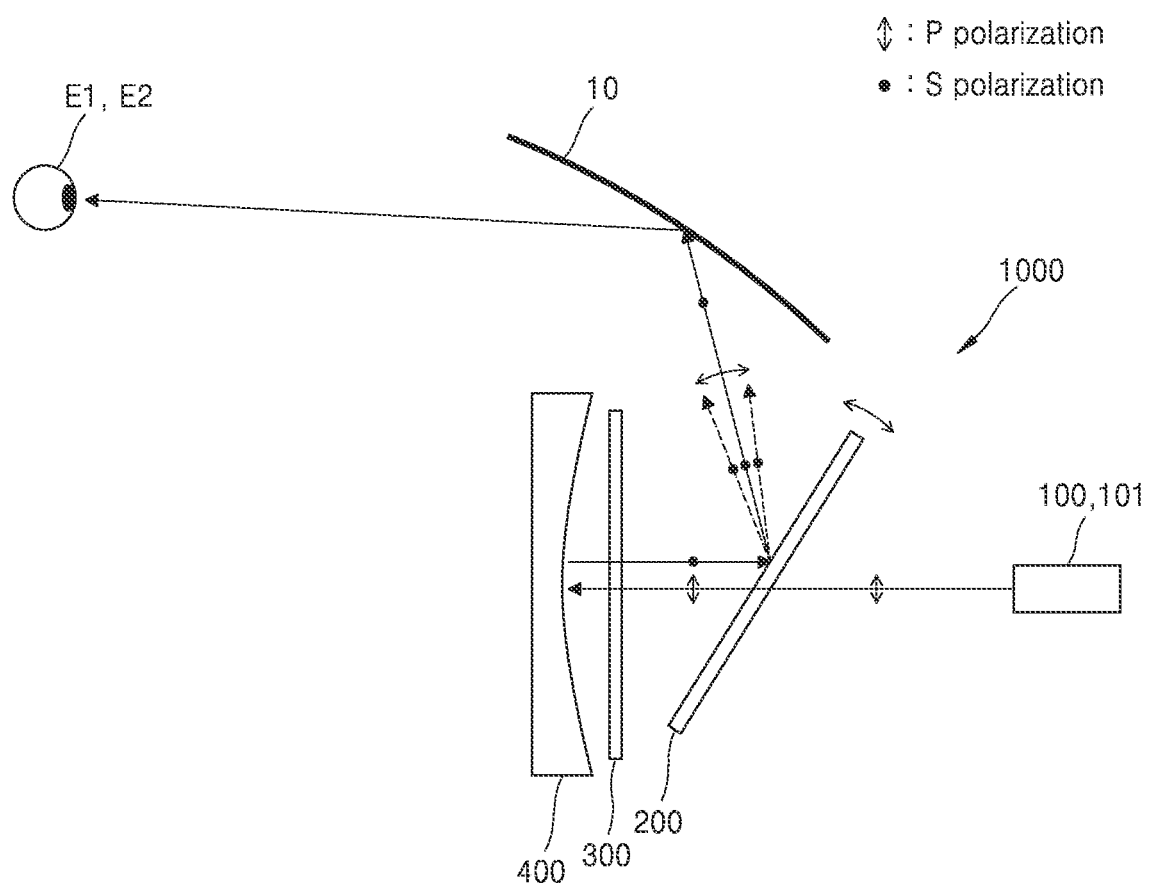
FIG. 1 is a side view schematically showing a configuration of a head-up display system according to an example embodiment.

Reference will now be made in detail to embodiments, examples of which are illustrated in the accompanying drawings, wherein like reference numerals refer to like elements throughout. In this regard, the present example embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a head-up display system according to an example embodiment will be described in detail with reference to the accompanying drawings. The size or thickness of each component in the drawings may be exaggerated for clarity and convenience of explanation. The embodiments described below are merely examples, and various configurations that have been modified from these embodiments may be implemented.

When an element or layer is referred to as being "on" or "above" another element or layer, the element or layer may be directly on another element or layer or there may be intervening elements or layers. The singular forms include the plural forms unless the context clearly indicates otherwise. It should be understood that, when a part "comprises" or "includes" an element in the specification, unless otherwise defined, it does not exclude other elements but may further include other elements.

The term "above" and similar directional terms may be applied to both singular and plural.

Although the terms 'first', 'second', etc. may be used herein to describe various constituent elements, these constituent elements should not be limited by these terms. The terms are only used to distinguish one constituent element from another.

Figure 2:
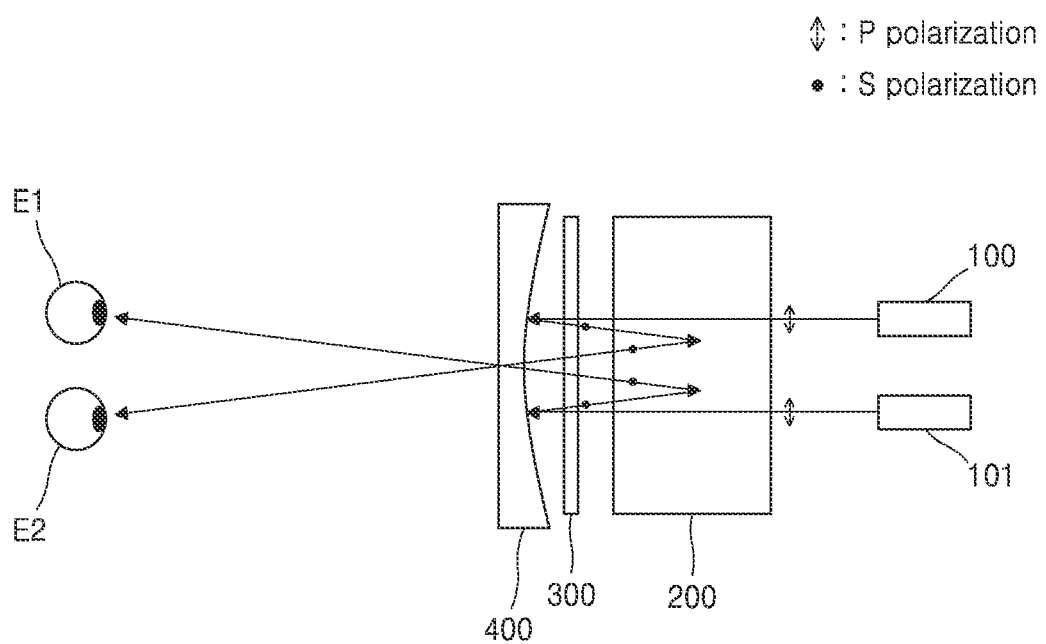
FIG. 2 is a plan view schematically showing the configuration of the head-up display system according to an example embodiment.

FIG. 1 is a side view schematically showing a configuration of a head-up display system 1000 according to an example embodiment of the disclosure. FIG. 2 is a plan view schematically showing the configuration of the head-up display system 1000 according to an example embodiment of the disclosure.

Referring to FIG. 1, the head-up display system 1000 may include: image generating apparatuses 100 and 101 configured to emit light of a first polarization including image information; a polarization beam splitter (PBS) 200 provided on an optical path of the light of the first polarization emitted from the image generating apparatuses 100 and 101 and configured to transmit the light of the first polarization; a wave plate 300 that is provided on an optical path of the light transmitted through the polarization beam splitter 200 and configured to transmit the light transmitted through the polarization beam splitter 200 while converting (i.e., changing) a phase of the light; and a mirror 400 that is provided on an optical path of the light sequentially passing through the polarization beam splitter 200 and the wave plate 300 and configured to reflect the light transmitted through the polarization beam splitter 200 and the wave plate 300 back to the polarization beam splitter 200 through the wave plate 300.

The image generating apparatuses 100 and 101 may include a display panel 20 (see FIG. 13) for generating light including image information and an optical system 30 (see FIG. 13) configured to diffuse light from the display panel 20. A detailed configuration of the image generating apparatuses 100 and 101 will be described later with reference to FIG. 13. The image generating apparatuses 100 and 101 may emit light of a first polarization. For example, as illustrated in FIG. 1, the first polarization may be horizontal polarization (P polarization). However, the disclosure is not limited thereto, and the first polarization may be vertical polarization (S polarization). The image generating apparatuses 100 and 101 may include a first image generating apparatus 100 generating an image to be provided to a left eye and a second image generating apparatus 101 generating an image to be provided to a right eye. Both the first image generating apparatus 100 and the second image generating apparatus 101 may emit light of the same first polarization. The image from the first image generating apparatus 100 and the image from the second image generating apparatus 101 may be different from each other. Accordingly, a three-dimensional (3D) stereoscopic image in which the image from the first image generating apparatus 100 and the image from the second image generating apparatus 101 are combined may be provided to the driver. Also, the first image generating apparatus 100 and the second image generating apparatus 101 may generate a computer generated hologram (CGH) image. For example, the display panel 20 included in the first image generating apparatus 100 and the second image generating apparatus 101 may generate the CGH image.

The polarization beam splitter 200 may be provided on an optical path of light emitted from the image generating apparatuses 100 and 101. For example, the center point of the polarization beam splitter 200 may be located on the optical path of the light. However, the disclosure is not limited thereto, and the polarization beam splitter 200 may be located anywhere on the optical path of the light emitted from the image generating apparatuses 100 and 101. The polarization beam splitter 200 may be configured to transmit or reflect incident light depending on the type of the polarization of the incident light. The polarization beam splitter 200 may be configured to transmit the light from the image generating apparatuses 100 and 101. For example, the polarization beam splitter 200 may be configured to transmit light of the first polarization generated by the image generating apparatuses 100 and 101. For example, as illustrated in FIG. 1, the polarization beam splitter 200 may be configured to transmit light of horizontal polarization (P polarization) emitted from the image generating apparatuses 100 and 101. The incident surface of the polarization beam splitter 200 on which the light emitted from the image generating apparatuses 100 and 101 is incident may be inclined at a certain angle with respect to the optical path of the light. The polarization beam splitter 200 may be configured to be rotatable. For example, the polarization beam splitter 200 may be rotated so that the incident angle of the light emitted from the image generating apparatuses 100 and 101 to the incident surface of the polarization beam splitter 200 is changed.

The wave plate 300 may be provided on the optical path of the light transmitted through the polarization beam splitter 200. The wave plate 300 may be configured to transmit incident light while converting a phase of the incident light. For example, the wave plate 300 may be configured to convert the phase of the light of the first polarization emitted from the image generating apparatuses 100 and 101 and transmitted through the polarization beam splitter 200 by 90 degrees. For example, when the light of the first polarization emitted from the image generating apparatuses 100 and 101 is light of horizontal polarization (P polarization), the light transmitted through the wave plate 300 may be converted into light of circular polarization. For example, the wave plate 300 may include a quarter wave plate (QWP).

The mirror 400 may be provided on an optical path of the light transmitted through the wave plate 300. For example, the mirror 400 may include a concave mirror. In this case, the light reflected by the mirror 400 may be focused on the focal point of the mirror 400. For example, the mirror 400 may include any one of an aspheric mirror or a freeform curved mirror. However, embodiments of the present disclosure is not limited thereto, and the mirror 400 may include a spherical mirror. In FIG. 1, the wave plate 300 and the mirror 400 are shown as being spaced apart from each other, but embodiments of the present disclosure is not limited thereto. For example, the wave plate 300 and the mirror 400 may be integrally formed.

The mirror 400 may reflect the light transmitted through the wave plate 300 to be transmitted back through the wave plate 300. When the light is transmitted back through the wave plate 300, the phase of the light may be converted again by the wave plate 300. For example, the phase of light reflected by the mirror 400 may be converted by 90 degrees by being transmitted through the wave plate 300. For example, when the first polarization light emitted from the image generating apparatuses 100 and 101 is light of the horizontal polarization (P polarization), the light of the first polarization is transmitted through the wave plate 300 to be converted into light of circular polarization, and the light of the circular polarization is reflected by the mirror 400 and transmitted back through the wave plate 300 to be converted into light of a second polarization different from the first polarization. For example, the second polarization may be vertical polarization (S polarization). As described above, the light of the first polarization (for example, P polarization) emitted from the image generating apparatuses 100 and 101 may be converted into the light of the second polarization (for example, S polarization) by being transmitted through the wave plate 300 twice. However, embodiments of the present disclosure is not limited thereto, and when the light of the first polarization emitted from the image generating apparatuses 100 and 101 is light of vertical polarization (S polarization), the light of the second polarization may be light of horizontal polarization (P polarization). For example, a polarization axis of the first polarization and a polarization axis of the second polarization may be perpendicular to each other.

As described above, the light of the first polarization (for example, P polarization) emitted from the image generating apparatuses 100 and 101 may sequentially pass through the polarization beam splitter 200 and the wave plate 300. The light sequentially passing through the polarization beam splitter 200 and the wave plate 300 may be reflected by the mirror 400 to be transmitted back through the wave plate 300 while being converted into light of the second polarization (for example, S polarization) and directed back to the polarization beam splitter 200. Then, the light of the second polarization (for example, S polarization) transmitted through the wave plate 300 to be directed to the polarization beam splitter 200 may be finally reflected by the polarization beam splitter 200. For example, the polarization beam splitter 200 may be configured to reflect the light of the second polarization (for example, S polarization) to be directed to the windshield 10 of the vehicle. The light of the second polarization (for example, S polarization) directed to the windshield 10 may be reflected by the windshield 10 to be directed to the driver's eyes E1 and E2. For example, the image to be provided in the left eye generated by the first image generating apparatus 100 may be provided to the left eye E1. In addition, the image to be provided in the right eye generated by the second image generating apparatus 101 may be provided to the right eye E2. Accordingly, the driver may recognize the image generated from the image generating apparatuses 100 and 101. Also, even if the positions of the driver's eyes E1 and E2 are changed, the light from the image generating apparatuses 100 and 101 may be provided to the eyes E1 and E2 whose positions are changed by the rotation of the polarization beam splitter 200.

As described above with reference to FIG. 1, the light emitted from the image generating apparatuses 100 and 101 may pass through the polarization beam splitter 200 and finally be provided to the windshield 10. As described above, by adapting the polarization beam splitter 200, the image generating apparatuses 100 and 101 may be appropriately arranged to prevent the volume of the head-up display system 1000 from being increased. When the polarization beam splitter 200 is not provided, it may be necessary to additionally arrange a separate optical system so that the light from the image generating apparatuses 100 and 101 can be directed to the windshield 10. In this case, the volume of the head-up display system 1000 may be increased.

Referring to FIG. 2, when the head-up display system 1000 is viewed from above, the image generating apparatuses 100 and 101, the polarization beam splitter 200, the wave plate 300 and the mirror 400 may be sequentially arranged on a straight line. Accordingly, when the mirror 400 is a concave mirror, the optical path of light emitted from the image generating apparatuses 100 and 101 may be parallel to an extension line of a straight line connecting the center point of the mirror 400 and the focus (i.e., focal point) of the mirror 400. Accordingly, aberration with respect to the light emitted from the image generating apparatuses 100 and 101, which may be caused by the mirror 400, can be suppressed. Therefore, even if the mirror 400 including a spherical mirror is applied, the occurrence of aberration in the head-up display system 1000 can be minimized.

Figure 3:
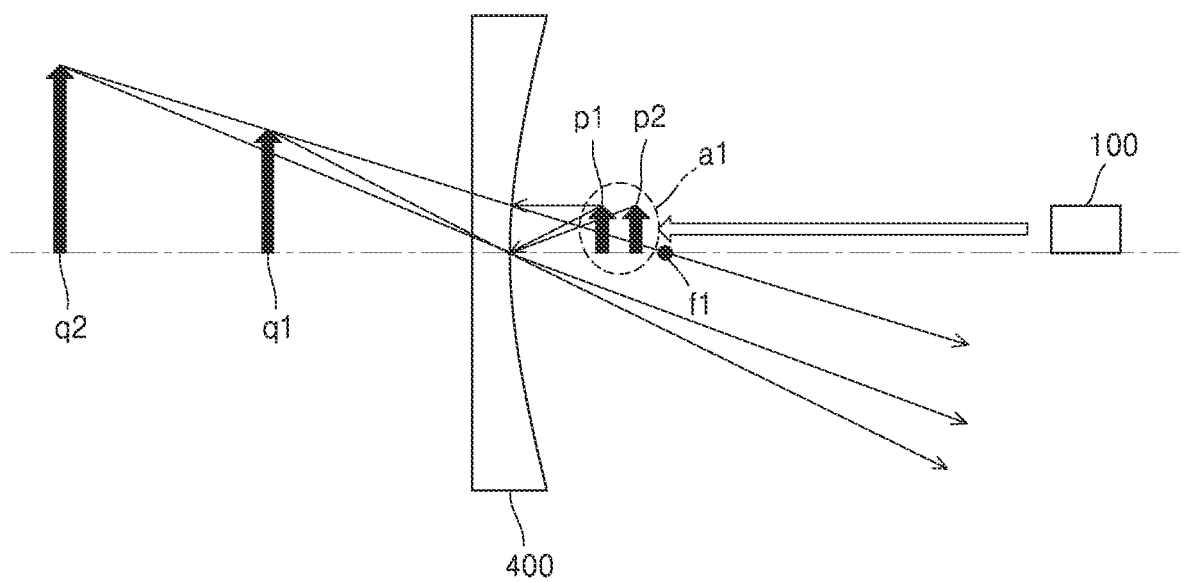
FIG. 3 is a side view schematically showing an image forming position by the image generating apparatus of FIG. 1 according to an example embodiment.

Furthermore, the image generating apparatuses 100 and 101 may be configured to project an image between the mirror 400 and the focal point f1 of the mirror (see FIG. 3). The position of the image formation by the image generating apparatuses 100 and 101 will be described later with reference to FIGS. 3 and 4.

Figure 4:
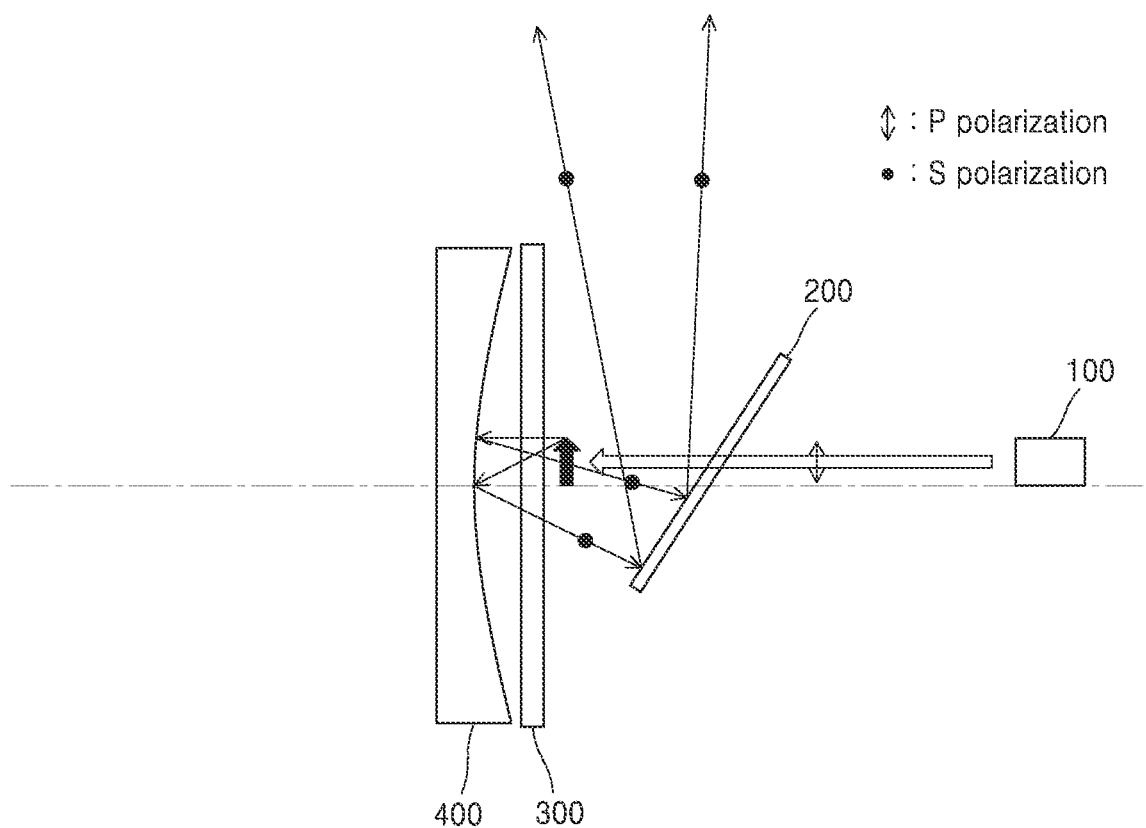
FIG. 4 is a side view schematically showing an optical path of light emitted from the image generating apparatus of FIG. 1 according to an example embodiment.

FIG. 3 is a side view schematically showing an image forming position by the image generating apparatus 100 of FIG. 1 according to an example embodiment of the disclosure. FIG. 4 is a side view schematically showing an optical path of light emitted from the image generating apparatus 100 of FIG. 1 according to an example embodiment of the disclosure. In FIGS. 3 and 4, only the first image generating apparatus 100 of FIG. 1 is illustrated. The contents described with reference to FIGS. 3 and 4 may also be applied to the second image generating apparatus 101 of FIG. 1. FIGS. 3 and 4 show a mirror 400 that is a concave mirror. In describing FIGS. 3 and 4, descriptions already given with reference to FIGS. 1 and 2 will be omitted.

Referring to FIG. 3, the first image generating apparatus 100 is provided outside an arbitrary area a1 between the mirror 400 and the focal point f1 of the mirror 400 and may form an image in the area a1. In other words, the first image generating apparatus 100 may have a projector function that forms an image in the region a1. For example, the first image generating apparatus 100 may be provided on an extension line of a straight line connecting the center point of the mirror 400 and the focal point f1 of the mirror 400. Accordingly, an optical path of the light emitted from the first image generating apparatus 100 may be parallel to a straight extension line connecting the center point of the mirror 400 and the focal point f1 of the mirror 400. In this case, aberration caused by the mirror 400 can be suppressed compared to the case where the optical path of the light emitted from the first image generating apparatus 100 is not parallel to the extension line of the line connecting the center point of the mirror 400 and the focal point f1 of the mirror 400. Therefore, even if the size of the mirror 400 is increased to widen the field of view in the head-up display system 1000 using the configuration of FIG. 3, occurrence of aberrations that may occur by the mirror 400 can be suppressed.

Furthermore, the first image generating apparatus 100 may be configured to project a first image p1 at a first position in the region a1. In this case, a first virtual image q1 for the first image p1 may be generated by the mirror 400. Also, for example, the image generating apparatus 100 may be configured to project a second image p2 at the second position in the area a1. In this case, a second virtual image q2 for the second image p2 may be generated by the mirror 400. The first image p1 may be formed at a position closer to the mirror 400 than the second image p2. In other words, the focal point f1 of the mirror 400 may be closer to the second image p2 than to the first image p1. Accordingly, the VID of the second virtual image q2 may be longer than the VID of the first virtual image q1. As described above, the VID of the image may be increased by appropriately adjusting the image forming position of the image generated from the image generating apparatus 100. For example, the VID in the head-up display 1000 of FIG. 1 may be longer than 7 m.

Light from the outside (for example, sunlight) may be focused to the focal point f1 by the mirror 400. Accordingly, when the first image generating apparatus 100 is provided in the area a1, the temperature of the first image generating apparatus 100 may be increased above an allowable operating temperature, so that the reliability of the head-up display system 1000 may be significantly reduced. As illustrated in FIG. 3, according to an example embodiment of the disclosure, the first image generating apparatus 100 may be provided outside the area a1. Accordingly, even if light from the outside (for example, sunlight) is focused to the focal point f1 by the mirror 400, performance deterioration of the first image generating apparatus 100 due to an increase in temperature due to external light may not occur.

Referring to FIG. 4, light of the first polarization (for example, P polarization) generated from the first image generating apparatus 100 may be transmitted through the polarization beam splitter 200. In this case, an image included in the light of the first polarization may be generated between the polarization beam splitter 200 and the wave plate 300. However, the disclosure is not limited thereto, and an image included in the light of the first polarization may be generated between the wave plate 300 and the mirror 400. The light of the first polarization transmitted through the polarization beam splitter 200 may be transmitted through the wave plate 300 to be converted into light of circular polarization. The light of the circular polarization transmitted through the wave plate 300 may be reflected by the mirror 400 to travel back to the wave plate 300. The light of the circular polarization reflected by the mirror 400 may be transmitted back through the wave plate 300 to be converted into light of a second polarization (for example, S polarization). The light of the second polarization transmitted back through the wave plate 300 may be reflected by the polarization beam splitter 200. The light of the second polarization reflected by the polarization beam splitter 200 may be reflected by the windshield 10 (see FIG. 1) or the like to be provided to the driver.

As described above, the image included in the light of the first polarization emitted from the image generating apparatus 100 is formed between the mirror 400 and the focal point f1 of the mirror 400, and this image may be provided to the driver in a state where the phase is converted by the combination of the polarization beam splitter 200, the wave plate 300 and the mirror 400.

Figure 5:
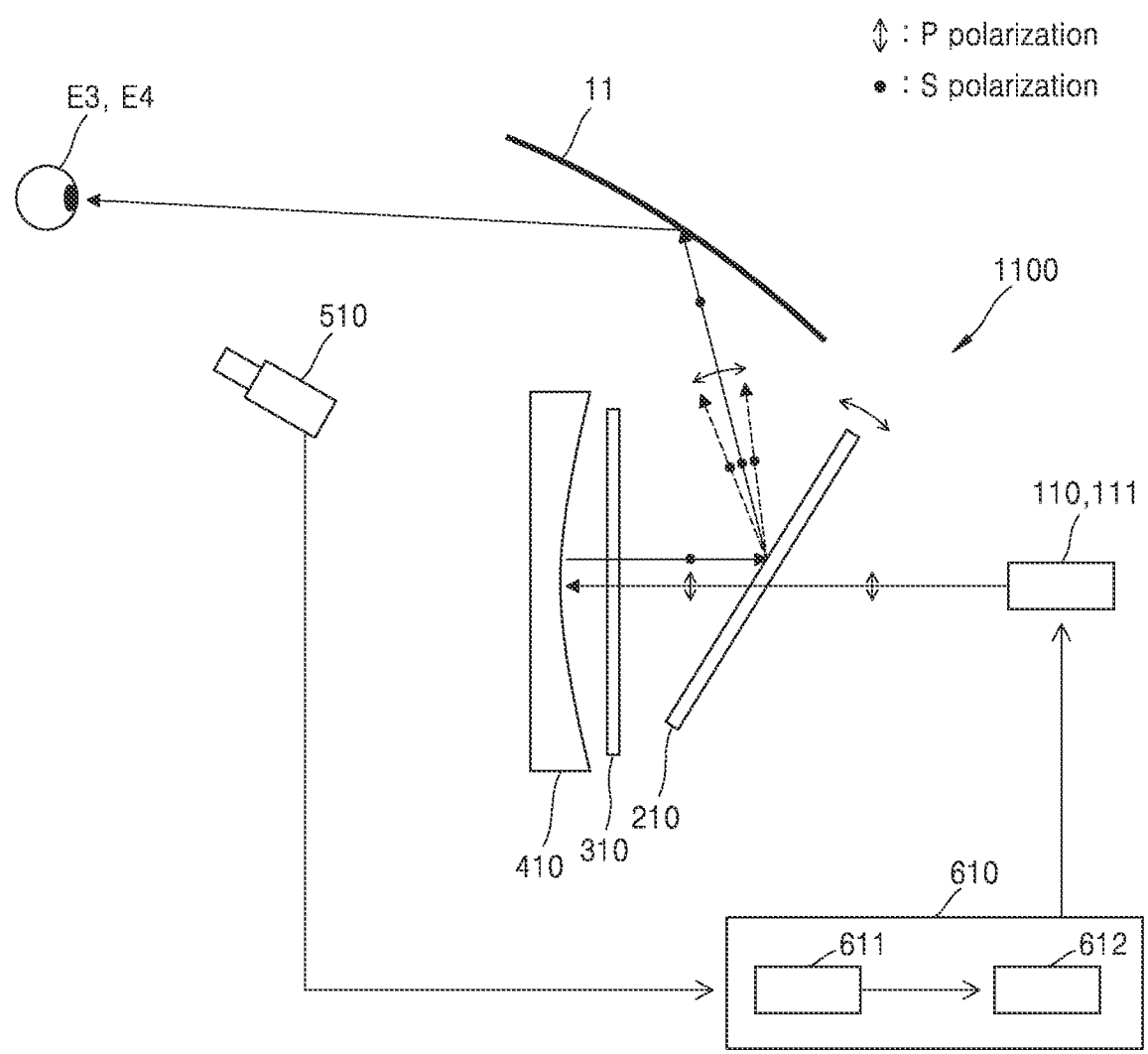
FIG. 5 is a side view schematically showing a configuration of a head-up display system according to another example embodiment.

FIG. 5 is a side view schematically showing a configuration of a head-up display system 1100 according to an example embodiment of the disclosure. The configuration of the head-up display system 1100 of FIG. 5 may be substantially the same as that of the head-up display system 1000 of FIG. 1 except for the sensor 510 and the processor 610. In describing FIG. 5, descriptions already given with reference to FIGS. 1 to 4 will be omitted.

Referring to FIG. 5, the head-up display system 1100 may include: image generating apparatuses 110 and 111 configured to emit light of a first polarization including image information; a polarization beam splitter 210 provided on an optical path of the light of the first polarization emitted from the image generating apparatuses 110 and 111 and configured to transmit the light of the first polarization; a wave plate 310 that is provided on an optical path of the light transmitted through the polarization beam splitter 210 and configured to transmit the light transmitted through the polarization beam splitter 210 while converting a phase of the light; and a mirror 410 that is provided on an optical path of the light transmitted through the polarization beam splitter 210 and the wave plate 310 and configured to reflect the light transmitted through the polarization beam splitter 210 and the wave plate 310 back to the polarization beam splitter 210 through the wave plate 310. Furthermore, the head-up display system 1100 may further include a sensor 510 configured to track positions of the eyes E3 and E4 of the user (for example, driver) and a processor 610 configured to control the movement of the image generating apparatuses 110 and 111 based on information about the positions of the user's eyes E3 and E4 acquired through the sensor 510.

The sensor 510 may include, for example, a camera that photographs the positions of the eyes E3 and E4. The sensor 510 may acquire a gaze vector indicating a user's gaze direction by tracking the positions and direction of the user's eyes E3 and E4. For example, the sensor 510 may acquire the gaze vector of the user by using a technique of detecting a gaze direction using corneal reflections generated by infrared light. However, the disclosure is not limited thereto, and the sensor 510 may obtain an image of the pupil using computer vision technology, and track a change in the position of the pupil using the obtained image. The sensor 510 may obtain a gaze vector using the change in the positions of the eyes E3 and E4. The sensor 510 may provide the obtained gaze vector to the processor 610.

The processor 610 may include an operation unit 611 that calculates the movement direction and position of the eyes E3 and E4 based on the information about the position of the eyes E3 and E4 provided from the sensor 510, and a driving unit 612 that moves the image generating apparatuses 110 and 111 based on the information about the eyes E3 and E4 from the operation unit 611 and the pre-calibrated data. For example, based on the calculation result of the operation unit 611, the driving unit 612 may move the image generating apparatuses 110 and 111 to an optimal position for providing images to the user's eyes E3 and E4. In addition, the processor 610 may independently control movements of the first image generating apparatus 110 and the second image generating apparatus 111. For example, in response to different positions of the left eye E3 and the right eye E4, the first image generating apparatus 110 and the second image generating apparatus 111 may be respectively moved to appropriate positions. For example, the processor 610 may change the positions of the first image generating apparatus 110 and the second image generating apparatus 111 in three-dimensional (3D) space. In addition, the processor 610 may control the first image generating apparatus 110 and the second image generating apparatus 111 to generate different images. Accordingly, an image to be provided to a left eye generated by the first image generating apparatus 110 and an image to be provided to a right eye, which is different from the image generated by the first image generating apparatus 110, generated by the second image generating apparatus 111 may be provided to the user's left eye E3 and right eye (E4), respectively.

As the processor 610 independently controls the positions of the first image generating apparatus 110 and the second image generating apparatus 111 in a three-dimensional space, aberrations that may be caused by the windshield 11 may be corrected. For example, aberrations for light reflected by the polarization beam splitter 210 and incident on the windshield 11 may be generated due to the shape of an incident surface of the windshield 11. The aberrations may be corrected through independent movements in the 3D space of the first image generating apparatus 110 and the second image generating apparatus 111.

Figure 6:
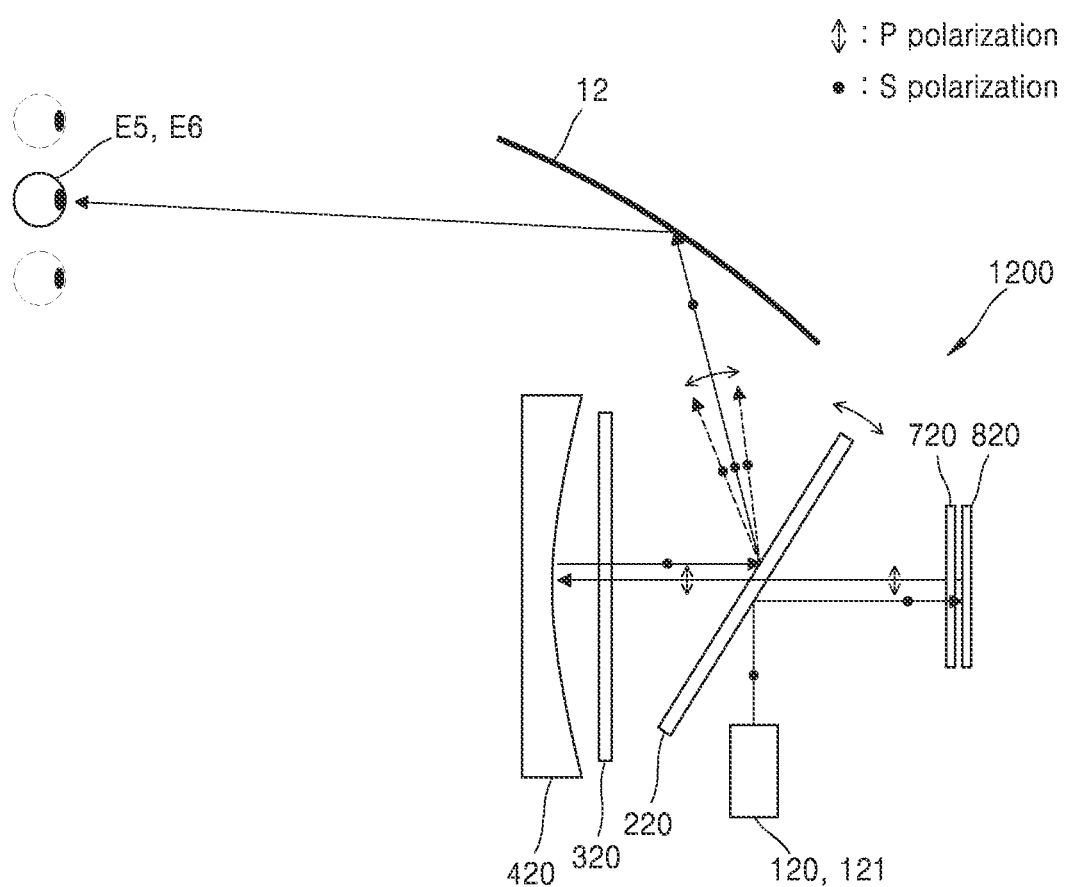
FIG. 6 is a side view schematically showing a configuration of a head-up display system according to another example embodiment.

FIG. 6 is a side view schematically showing a configuration of a head-up display system 1200 according to an example embodiment of the disclosure. In describing FIG. 6, descriptions already given with reference to FIGS. 1 to 4 will be omitted.

Referring to FIG. 6, the head-up display system 1200 may include: image generating apparatuses 120 and 121 configured to emit light of a first polarization including image information; a first polarization beam splitter 220 provided on an optical path of the light of a first polarization emitted from the image generating apparatuses 120 and 121 and configured to reflect the light of the first polarization; a first wave plate 720 that is provided on the optical path of the light reflected by the first polarization beam splitter 220 and configured to transmit the light reflected by the first polarization beam splitter 220 while converting a phase of the light; a first mirror 820 that is provided on the optical path of the light transmitted by the first wave plate 720 and configured to reflect the light transmitted through the first wave plate 720 back to the first polarization beam splitter 220 through the first wave plate 720; a second wave plate 320 that is provided to be spaced apart from the first wave plate 720 with the first polarization beam splitter 220 therebetween and configured to transmit the light reflected by the first mirror 820 and sequentially passing back through the first wave plate 720 and the first polarization beam splitter 220 while converting a phase of the light; and a second mirror 420 configured to reflect the light sequentially passing through the first polarization beam splitter 220 and the second wave plate 320 back to the first polarization beam splitter 220 through the second wave plate 320.

The image generating apparatuses 120 and 121 may be configured to emit light of a first polarization. For example, as illustrated in FIG. 6, the first polarization may be vertical polarization (S polarization). However, embodiments of the present disclosure is not limited thereto, and the first polarization may be horizontal polarization (P polarization). The image generating apparatuses 120 and 121 may include a first image generating apparatus 120 generating a left eye image and a second image generating apparatus 121 generating a right eye image. Both the first image generating apparatus 120 and the second image generating apparatus 121 may emit light having the same first polarization.

The first polarization beam splitter 220 may be provided on an optical path of light emitted from the image generating apparatuses 120 and 121. The first polarization beam splitter 220 may be configured to transmit or reflect light depending on the type of the polarization. The first polarization beam splitter 220 may be configured to reflect the light from the image generating apparatuses 120 and 121. For example, the first polarization beam splitter 220 may be configured to reflect light of the first polarization generated by the image generating apparatuses 120 and 121. For example, the first polarization beam splitter 220 may be configured to reflect the light of vertical polarization (S polarization) emitted from the image generating apparatuses 120 and 121. The incident surface of the first polarization beam splitter 220 for the light emitted from the image generating apparatuses 120 and 121 may be inclined at a certain angle with respect to the optical path of the light. The first polarization beam splitter 220 may be configured to be rotatable. For example, the first polarization beam splitter 220 may be rotated so that the incident angle of the light emitted from the image generating apparatuses 120 and 121 to the incident surface of the first polarization beam splitter 220 is changed.

The first wave plate 720 may be provided on an optical path of the light reflected by the first polarization beam splitter 220. The first wave plate 720 may be configured to transmit incident light while converting a phase of the incident light. For example, the first wave plate 720 may be configured to convert the phase of the light of the first polarization emitted from the image generating apparatuses 120 and 121 and reflected by the polarization beam splitter 220 by 90 degrees. For example, when the light of the first polarization emitted from the image generating apparatuses 120 and 121 is light of vertical polarization (S polarization), the light transmitted through the first wave plate 720 may be converted into light of circular polarization. For example, the first wave plate 720 may include a quarter wave plate (QWP).

The first mirror 820 may be provided on an optical path of light transmitted through the first wave plate 720. The first mirror 820 may serve to change the optical path of the light transmitted through the first wave plate 720. For example, the first mirror 820 may include a planar mirror. However, embodiments of the present disclosure is not limited thereto, and the first mirror 820 may include a concave mirror having any one of a spherical surface, an aspherical surface, or a freeform curved surface. If the first mirror 820 is a concave mirror having any one of an aspherical surface or a freeform curved surface, occurrence of aberration may be suppressed.

The first mirror 820 may reflect the light transmitted through the first wave plate 720 to be transmitted back through the first wave plate 720. When the light is transmitted back through the first wave plate 720, the phase of the light may be converted again by the first wave plate 720. For example, the phase of light reflected by the first mirror 820 may be converted by 90 degrees by being transmitted back through the first wave plate 720. For example, the light of the first polarization (for example, S polarization) emitted from the image generating apparatuses 120 and 121 may be transmitted through the first wave plate 720 to be converted into light of circular polarization. The light of circular polarization may be converted into light of the second polarization (for example, P polarization) different from the first polarization (for example, S polarization) by being reflected by the first mirror 820 and being transmitted back through the first wave plate 720. As described above, the light of the first polarization (for example, S polarization) emitted from the image generating apparatuses 120 and 121 may be converted into the light of the second polarization (for example, P polarization) by being transmitted through the first wave plate 720 twice. For example, a polarization axis of the first polarization and a polarization axis of the second polarization may be perpendicular to each other. The light of the second polarization (for example, P polarization) generated from light reflected by the first mirror 820 and transmitted through the first wave plate 720 may then be transmitted through the first polarization beam splitter 220.

The second wave plate 320 may be provided on an optical path of the light transmitted through the first polarization beam splitter 220. For example, the first wave plate 720, the first polarization beam splitter 220, and the second wave plate 320 may be provided on a straight line. The image generating apparatuses 120 and 121 may be provided under the first polarization beam splitter 220. Accordingly, light incident from the lower side of the first polarization beam splitter 220 may be reflected by one side of the first polarization beam splitter 220 to be directed to the first mirror 820. And then light incident from the first polarization beam splitter 220 may be reflected in a direction opposite to the incident direction by the first mirror 820 to be directed back to the first polarization beam splitter 220. The light reflected by the first mirror 820 and directed to the first polarization beam splitter 220 may be transmitted through the first polarization beam splitter 220 to be directed to the second wave plate 320. The second wave plate 320 may transmit incident light while converting a phase of the incident light. For example, the second wave plate 320 may convert the phase of the light of the second polarization generated from light reflected by the first mirror 820 and transmitted through the first wave plate 720 by 90 degrees. Accordingly, the light of the second polarization may be converted to light of circular polarization by being transmitted through the second wave plate 320. For example, the second wave plate 320 may include a quarter wave plate (QWP).

The second mirror 420 may be provided on an optical path of the light transmitted through the second wave plate 320. For example, the second mirror 420 may include a concave mirror. In this case, the light reflected by the second mirror 420 may be focused on the focal point of the second mirror 420. For example, the second mirror 420 may include an aspheric mirror or a freeform curved mirror.

The second mirror 420 may reflect the light transmitted through the second wave plate 320 to be transmitted back through the second wave plate 320. When the light is transmitted back through the second wave plate 320, the phase of the light may be converted again by the second wave plate 320. For example, the phase of light reflected by the second mirror 420 may be converted by 90 degrees by being transmitted back through the second wave plate 320. For example, the light of the second polarization (for example, P polarization) generated from light reflected by the first mirror 820 and transmitted back through the first wave plate 720 may be converted into light of circular polarization by being transmitted through the second wave plate 320. The light of circular polarization may be converted into light of the first polarization (for example, S polarization) by being reflected by the second mirror 420 and being transmitted back through the second wave plate 320.

As described above, the light of the first polarization (for example, S polarization) emitted from the image generating apparatuses 120 and 121 may be reflected by the first polarization beam splitter 220 to travel toward the first wave plate 720 and the first mirror 820. The light of the first polarization (for example, S polarization) may be transmitted through the first wave plate 720 and then reflected by the first mirror 820 to be transmitted back through the first wave plate 720. As described above, the light of the first polarization (for example, S polarization) emitted from the image generating apparatuses 120 and 121 may be converted into the light of the second polarization (for example, P polarization) by being transmitted through the first wave plate 720 twice. The light of the second polarization (for example, P polarization) may be sequentially transmitted through the first polarization beam splitter 220 and the second wave plate 320. The light of the second polarization (for example, P polarization) may be transmitted through the second wave plate 320 and then reflected by the second mirror 420 to be transmitted back through the second wave plate 320. As described above, the light of the second polarization (for example, P polarization) may be converted into the light of the first polarization (for example, S polarization) by being transmitted through the second wave plate 320 twice. The light of the first polarization (for example, S polarization) reflected by the second mirror 420 and transmitted back to the first polarization beam splitter 220 through the second wave plate 320 may be reflected by the first polarization beam splitter 220 to travel toward the windshield 12 of the vehicle. The light of the first polarization (for example, S polarization) directed to the windshield 12 may be reflected by the windshield 12 to be directed to the driver's eyes E5 and E6. For example, an image to be provided to the left eye generated by the first image generating apparatus 120 may be provided to the left eye E5. In addition, an image to be provided to the right eye generated by the second image generating apparatus 121 may be provided to the right eye E6. Accordingly, the driver may recognize the image generated from the image generating apparatuses 120 and 121. Also, when the first polarization beam splitter 220 is configured to be rotatable, even if the positions of the driver's eyes E5 and E6 are changed, the light from the image generating apparatuses 120 and 121 may be transmitted to the eyes E5 and E6 whose positions are changed.

The second mirror 420 may include a concave mirror, and the image generating apparatuses 120 and 121 may form an image in an arbitrary region between the second mirror 420 and the focal point of the second mirror 420. In other words, the image generating apparatuses 120 and 121 may have a projector function for imaging an image in a specific area. For example, the optical path of the light emitted from the image generating apparatuses 120 and 121 and reflected by the first mirror 820 may be parallel to a straight extension line connecting a center point of the second mirror 420 and a focal point of the second mirror 420.

Figure 7:
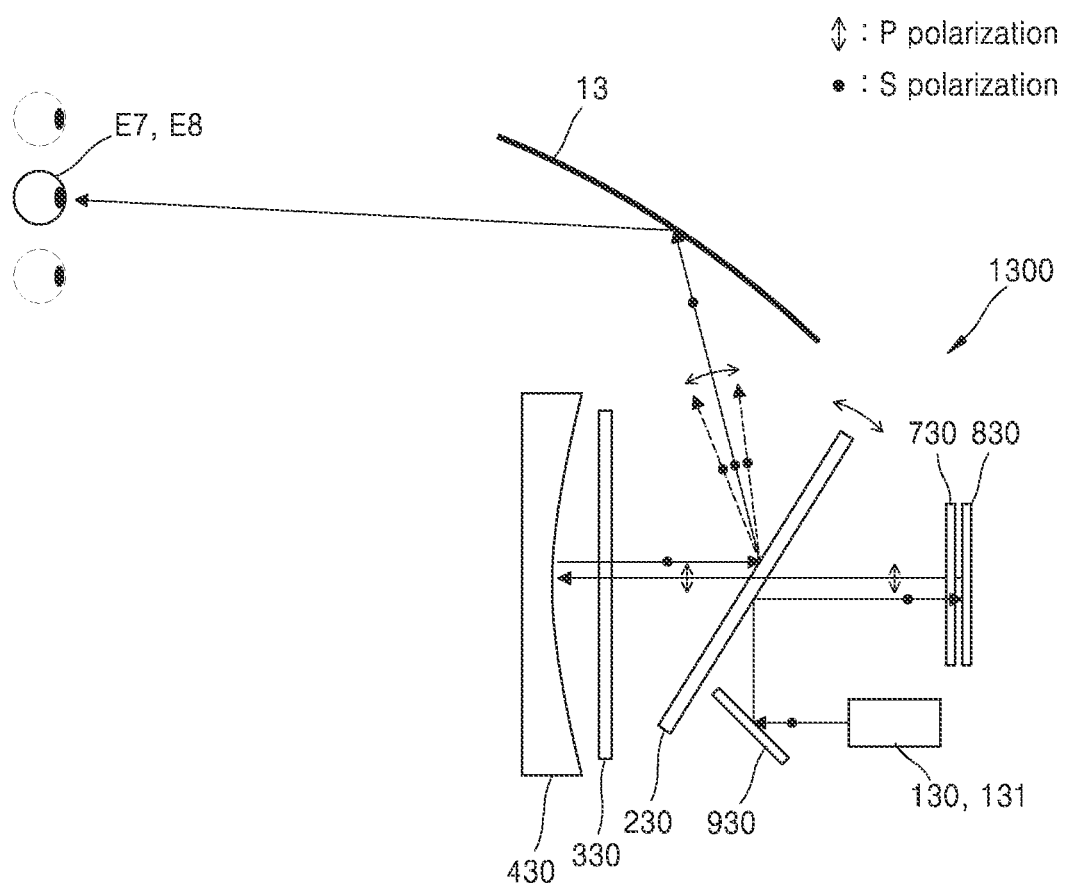
FIG. 7 is a side view schematically showing a configuration of a head-up display system according to another example embodiment.

FIG. 7 is a side view schematically showing a configuration of a head-up display system 1300 according to an example embodiment of the disclosure. The configuration of the head-up display system 1300 of FIG. 7 may be substantially the same as that of the head-up display system 1200 of FIG. 6 except for a third mirror 930. In describing FIG. 7, descriptions already given with reference to FIGS. 1 to 4 and 6 will be omitted.

Referring to FIG. 7, the head-up display system 1300 may include: image generating apparatuses 130 and 131 configured to emit light of a first polarization including image information; a first polarization beam splitter 230 provided on an optical path of the light of a first polarization emitted from the image generating apparatuses 130 and 131 and configured to reflect the light of the first polarization; a first wave plate 730 that is provided on the optical path of the light reflected by the first polarization beam splitter 230 and configured to transmit the light reflected by the first polarization beam splitter 230 while converting a phase of the light; a first mirror 830 that is provided on the optical path of the light transmitted by the first wave plate 730 and configured to reflect the light transmitted through the first wave plate 730 back to the first polarization beam splitter 230 through the first wave plate 730; a second wave plate 330 that is provided to be spaced apart from the first wave plate 730 with the first polarization beam splitter 230 therebetween and configured to transmit the light reflected by the first mirror 830 and sequentially passing through the first wave plate 730 and the first polarization beam splitter 230 while converting a phase of the light; and a second mirror 430 configured to reflect the light transmitted through the first polarization beam splitter 230 and the second wave plate 330 back to the first polarization beam splitter 230 through the second wave plate 330.

Furthermore, the head-up display system 1300 may further include a third mirror 930 configured to transmit light from the image generating apparatuses 130 and 131 to the first polarization beam splitter 230. For example, the third mirror 930 may include a planar mirror. However, the disclosure is not limited thereto, and the third mirror 930 may include a concave mirror having any one of a spherical surface, an aspherical surface, or a freeform curved surface. For example, the third mirror 930 may reflect light incident from the image generating apparatuses 130 and 131 at a certain angle to travel toward the first polarization beam splitter 230.

Figure 8:
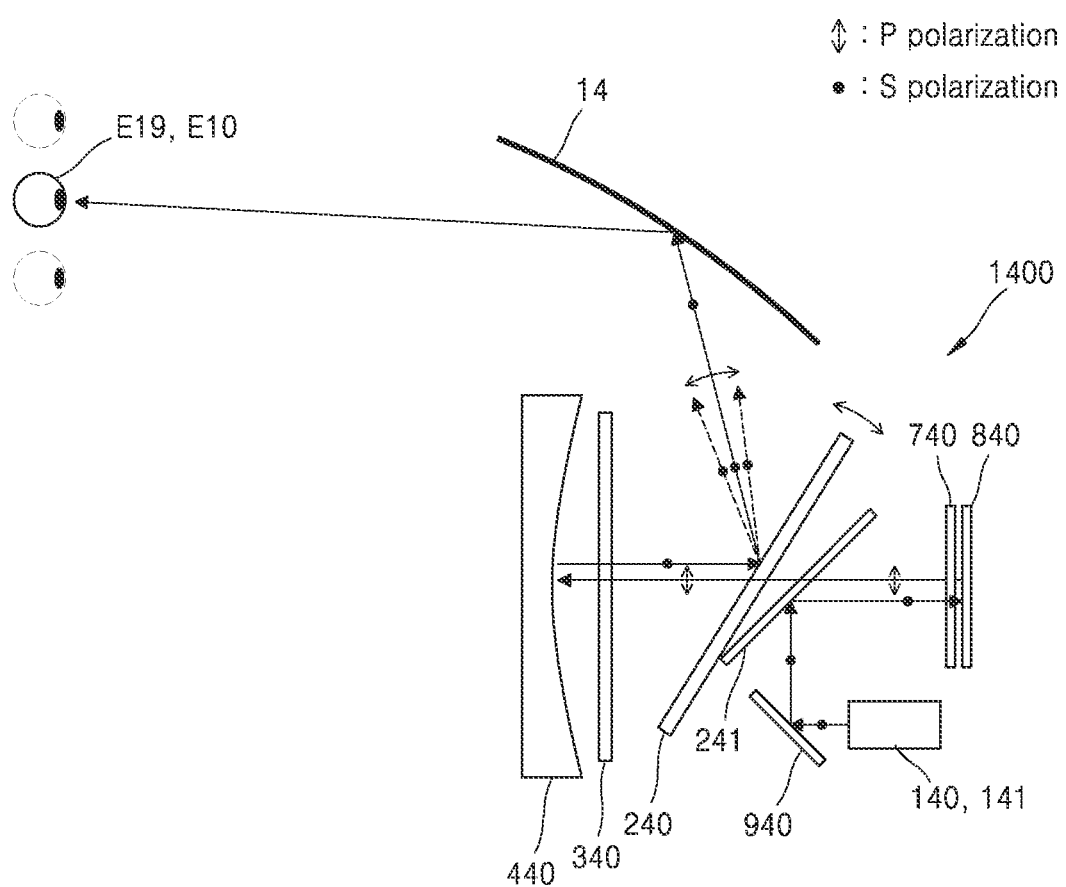
FIG. 8 is a side view schematically showing a configuration of a head-up display system according to another example embodiment.

FIG. 8 is a side view schematically showing a configuration of a head-up display system 1400 according to an example embodiment of the disclosure. The configuration of the head-up display system 1400 of FIG. 8 may be substantially the same as that of the head-up display system 1300 of FIG. 7 except for a second polarization beam splitter 241. In describing FIG. 8, descriptions already given with reference to FIGS. 1 to 4, 6 and 7 will be omitted.

Referring to FIG. 8, the head-up display system 1400 may include: image generating apparatuses 140 and 141 configured to emit light of a first polarization including image information; a second polarization beam splitter 241 provided on an optical path of the light of a first polarization emitted from the image generating apparatuses 140 and 141 and configured to reflect the light of the first polarization; a first wave plate 740 that is provided on the optical path of the light reflected by the second polarization beam splitter 241 and configured to transmit the light reflected by the second polarization beam splitter 241 while converting a phase of the light; a first mirror 840 that is provided on the optical path of the light transmitted by the first wave plate 740 and configured to reflect the light transmitted through the first wave plate 740 back to the second polarization beam splitter 241 through the first wave plate 740; a first polarization beam splitter 240 configured to transmit the light reflected by the first mirror 840 and sequentially passing through the first wave plate 740 and the second polarization beam splitter 241; a second wave plate 340 that is provided to be spaced apart from the first wave plate 740 with the first polarization beam splitter 240 therebetween and configured to transmit the light reflected by the first mirror 840 and sequentially passing back through the first wave plate 740, the second polarization beam splitter 241 and the first polarization beam splitter 240 while converting a phase of the light; and a second mirror 440 configured to reflect the light transmitted through the first polarization beam splitter 240 and the second wave plate 340 back to the first polarization beam splitter 240 through the second wave plate 340. Furthermore, the head-up display system 1400 may further include a third mirror 940 configured to transmit light from the image generating apparatuses 140 and 141 to the second polarization beam splitter 241.

The second polarization beam splitter 241 may reflect light of the first polarization (for example, S polarization) emitted from the image generating apparatuses 140 and 141 and reflected by the third mirror 940. The second polarization beam splitter 241 may be fixed not to be rotatable. In contrast, the first polarization beam splitter 240 may be configured to be rotatable. For example, the first polarization beam splitter 240 may rotate so that the incident angle of the light reflected by the second mirror 440 and transmitted through the second wave plate 340 with respect to the incident surface of the first polarization beam splitter 240 changes. If the head-up display system 1400 includes only the first polarization beam splitter 240 which is rotatable, as the first polarization beam splitter 240 rotates, the angle at which light incident from the image generating apparatuses 140 and 141 to the first polarization beam splitter 240 is reflected may be changed. In this case, the transmission of light from the image generating apparatuses 140 and 141 to the first wave plate 740 may not be performed accurately. As described above, the head-up display system 1400 includes both the first polarization beam splitter 240 which is rotatable and the second polarization beam splitter 241 which is fixed. Therefore, light emitted from the image generating apparatuses 140 and 141 may be more efficiently provided to the driver compared to a case in which only the rotatable first polarization beam splitter 240 which is included.

Figure 9:
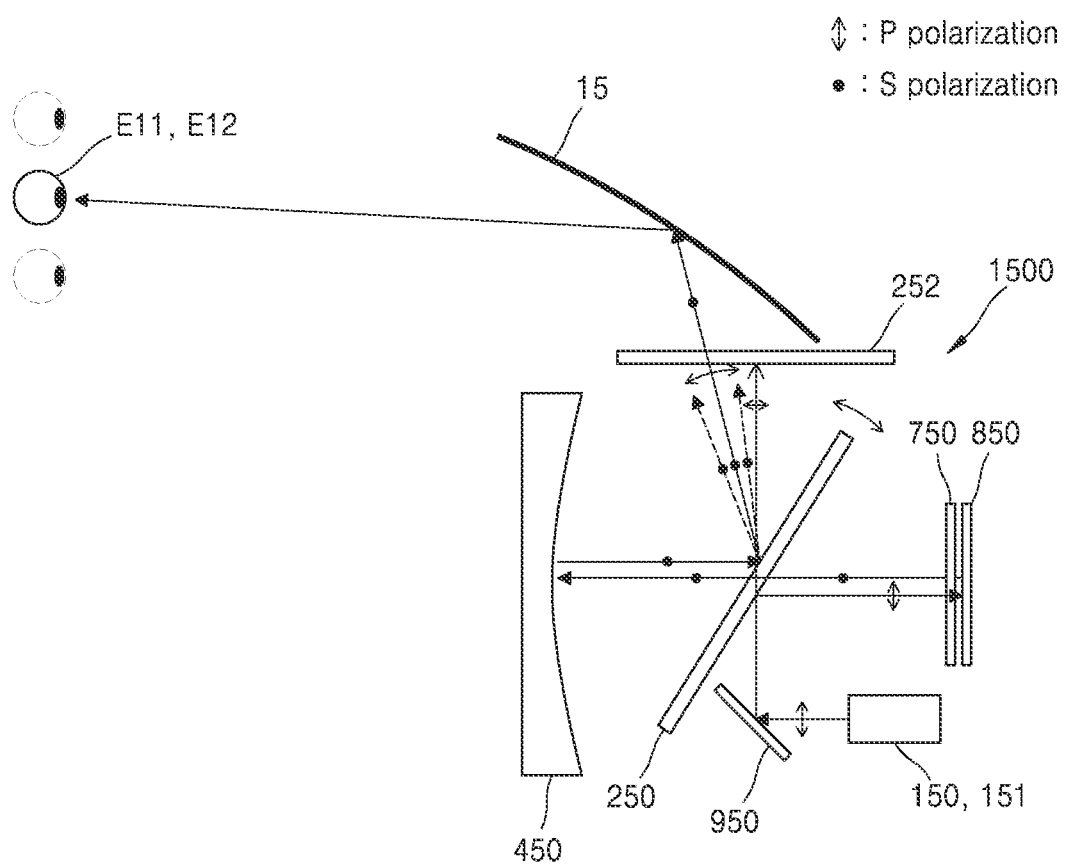
FIG. 9 is a side view schematically showing a configuration of a head-up display system according to another example embodiment.

FIG. 9 is a side view schematically showing a configuration of a head-up display system 1500 according to an example embodiment of the disclosure. The configuration of the head-up display system 1500 of FIG. 9 may be substantially the same as a configuration of the head-up display system 1200 of FIG. 6, except that the second wave plate 320 is not included and a polarizer 252 and a third mirror 950 are added. In describing FIG. 9, descriptions already given with reference to FIGS. 1 to 4 and 6 will be omitted.

Referring to FIG. 9, the head-up display system 1500 may include: image generating apparatus 150 and 151 configured to emit light of a first polarization including image information; a beam splitter 250 provided on an optical path of the light of the first polarization emitted from the image generating apparatus 150 and 151, and configured to reflect a portion of the light of the first polarization in a first direction and transmit the remaining portion of the light of the first polarization in a second direction different from the first direction; a wave plate 750 that is provided on an optical path of the light reflected in the first direction by the beam splitter 250 and configured to transmit the light reflected in the first direction by the beam splitter 250 while converting a phase of the light; a first mirror 850 that is provided on an optical path of the light transmitted through the wave plate 750 and configured to reflect the light transmitted through the wave plate 750 back to the beam splitter 250 through the wave plate 750; a second mirror 450 that is provided to be spaced apart from the first mirror 850 with the beam splitter 250 therebetween and configured to reflect back, toward the beam splitter 250, the light reflected by the first mirror 850 and sequentially passing through the wave plate 750 and the beam splitter 250. In addition, the head-up display system 1500 may further include a polarizer 252 configured to block the light of the first polarization transmitted through the beam splitter 250 and traveling in the second direction. For example, the first direction and the second direction may be perpendicular to each other. However, embodiments of the present disclosure is not limited thereto, and the first direction and the second direction may not be parallel to each other. Furthermore, the head-up display system 1500 may further include a third mirror 950 configured to transmit light from the image generating apparatuses 150 and 151 to the beam splitter 250.

The image generating apparatuses 150 and 151 may emit light of a first polarization. For example, as illustrated in FIG. 9, the light of the first polarization may be horizontal polarization (P polarization). However, embodiments of the present disclosure is not limited thereto, and the first polarization may be vertical polarization (S polarization). The image generating apparatuses 150 and 151 may include a first image generating apparatus 150 generating an image to be provided to a left eye and a second image generating apparatus 151 generating an image to be provided to a right eye.

The beam splitter 250 may be provided on an optical path of light emitted from the image generating apparatuses 150 and 151. The beam splitter 250 may be configured to reflect a portion of the incident light and transmit the remaining portion of the incident light regardless of the type of polarization of the incident light. For example, the beam splitter 250 may be configured to reflect a portion of the light of the first polarization (for example, P polarization) generated by the image generating apparatuses 150 and 151 and transmit the remaining portion of the light of the first polarization. In this case, a portion of the light reflected by the beam splitter 250 may be finally transmitted to the driver's eyes E11 and E12, and as described below, the remaining portion of the light transmitted through the beam splitter 250 may be blocked by the polarizer 252. The beam splitter 250 may be configured to be rotatable. For example, the beam splitter 250 may be rotated so that the incident angle of the light from the image generating apparatuses 150 and 151 to the incident surface of the beam splitter 250 is changed.

The wave plate 750 may be provided on an optical path of the light reflected by the beam splitter 250. For example, the wave plate 750 may be provided at a position spaced apart from the beam splitter 250 in the first direction. The wave plate 750 may be configured to transmit incident light while converting a phase of the incident light. For example, the wave plate 750 may be configured to convert the phase of the light of the first polarization (for example, P polarization) emitted from the image generating apparatuses 150 and 151 and reflected by the beam splitter 250 by 90 degrees. For example, the light of the first polarization (for example, P polarization) may be converted into light of circular polarization while being transmitted through the wave plate 750. For example, the wave plate 750 may include a quarter wave plate (QWP).

The first mirror 850 may be provided on an optical path of the light transmitted through the wave plate 750. The first mirror 850 may serve to change the optical path of the light transmitted through the wave plate 750. For example, the first mirror 850 may include a planar mirror. However, embodiments of the present disclosure is not limited thereto, and the first mirror 850 may include a concave mirror having any one of a spherical surface, an aspherical surface, or a freeform curved surface.

The first mirror 850 may reflect the light transmitted through the wave plate 750 to be transmitted back through the wave plate 750. The light of the first polarization (for example, P polarization) emitted from the image generating apparatuses 150 and 151 may be converted into the light of the second polarization (for example, S polarization) by being transmitted through the first wave plate 750 twice. A polarization axis of the first polarization (for example, P polarization) and a polarization axis of the second polarization (for example, S polarization) may be perpendicular to each other. The light of the second polarization (for example, S polarization) generated from light reflected by the first mirror 850 and transmitted through the wave plate 750 may then be transmitted through the beam splitter 250.

The second mirror 450 may be provided on an optical path of the light reflected by the first mirror 850 and transmitted through the wave plate 750 and the beam splitter 250. For example, centers of the wave plate 750, the beam splitter 250 and the second mirror 450 may be provided on a straight line. For example, the second mirror 450 may include a concave mirror. In this case, the light reflected by the second mirror 450 may be focused on the focal point of the second mirror 450. For example, the second mirror 450 may include an aspheric mirror or a freeform curved mirror. However, embodiments of the present disclosure is not limited thereto, and the second mirror 450 may include a spherical mirror.

The polarizer 252 may be provided on an optical path of the light transmitted through the beam splitter 250 from among the light emitted from the image generating apparatuses 150 and 151 and reflected by the third mirror 950 to be directed to the beam splitter 250. For example, the polarizer 252 may be provided at a position spaced apart from the beam splitter 250 in the second direction. The polarizer 252 may be configured to block light transmitted through the beam splitter 250 from among the light reflected by the third mirror 950 to travel toward the beam splitter 250. For example, when the image generating apparatuses 150 and 151 emit the light of the first polarization (for example, P polarization), the polarizer 252 may be configured to block the light of the first polarization (for example, P polarization). Further, the polarizer 252 may be configured to transmit the light of the second polarization (for example, S polarization) sequentially reflected by the second mirror 450 and the beam splitter 250. The light of the second polarization (for example, S polarization) transmitted through the polarizer 252 may be reflected by the windshield 15 and transmitted to the driver's eyes E11 and E12.

Figure 10:
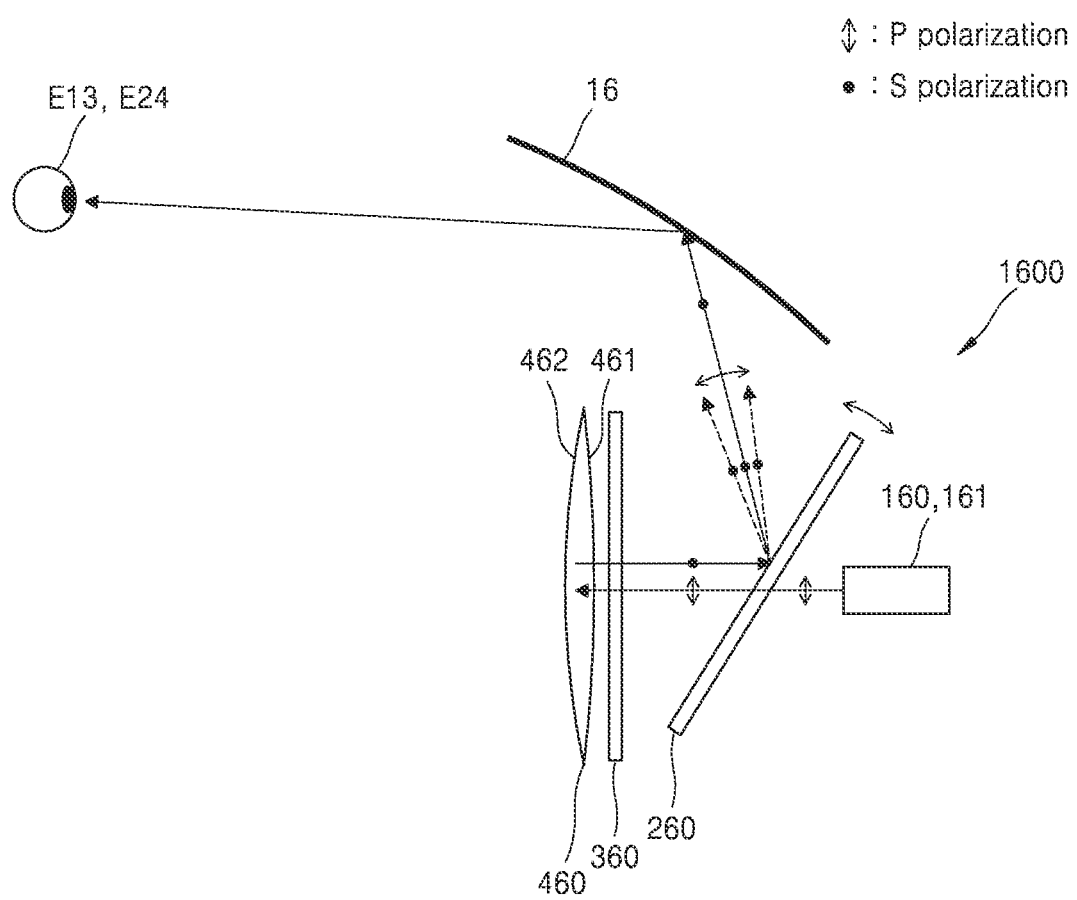
FIG. 10 is a side view schematically showing a configuration of a head-up display system according to another example embodiment.

FIG. 10 is a side view schematically showing a configuration of a head-up display system 1600 according to an example embodiment. The configuration of the head-up display system 1600 of FIG. 10 may be substantially the same as that of the head-up display system 1000 of FIG. 1 except for the convex lens 460 formed integrally with the mirror 462. In describing FIG. 10, descriptions already given with reference to FIG. 1 will be omitted.

Referring to FIG. 10, the head-up display system 1600 may include: image generating apparatuses 160 and 161 configured to emit light of a first polarization including image information; a polarization beam splitter (PBS) 260 provided on an optical path of the light of the first polarization emitted from the image generating apparatuses 160 and 161 and configured to transmit the light of the first polarization; a wave plate 360 that is provided on an optical path of the light transmitted through the polarization beam splitter 260 and configured to transmit the light transmitted through the polarization beam splitter 260 while converting a phase of the light; and a mirror 462 that is provided on an optical path of the light sequentially passing through the polarization beam splitter 260 and the wave plate 360 and configured to reflect the light transmitted through the polarization beam splitter 260 and the wave plate 360 back to the polarization beam splitter 260 through the wave plate 360. In addition, the head-up display system 1600 may further include a convex lens 460 provided between the mirror 462 and the wave plate 360 and configured to refract incident light.

The convex lens 460 may be provided on an optical path of light emitted from the image generating apparatuses 160 and 161 and sequentially passing through the polarization beam splitter 260 and the wave plate 360. The convex lens 460 may include an incident surface 461 on which the light sequentially passing through the polarization beam splitter 260 and the wave plate 360 is incident, and one surface opposite to the incident surface 461. In this case, the mirror 462 may have a shape corresponding to the shape of the one surface opposite to the incident surface 461 of the convex lens 460, and the mirror 462 may be formed integrally with the convex lens 460 in contact with the one surface of the convex lens 460. For example, the mirror 462 may be a concave mirror including a concave surface having a shape corresponding to the shape of the one surface of the convex lens 460. For example, the mirror 462 may be coated and formed in the shape of a thin film on the one surface of the convex lens 460. In this case, the light reflected by the mirror 462 may be focused on the focal point of the mirror 462. The light reflected by the mirror 462 may be refracted by the convex lens 460. Accordingly, the focal length of the mirror 462 may be shorter, and a configuration including the convex lens 460 may be more advantageous for miniaturization of the head-up display system 1600.

Figure 11:
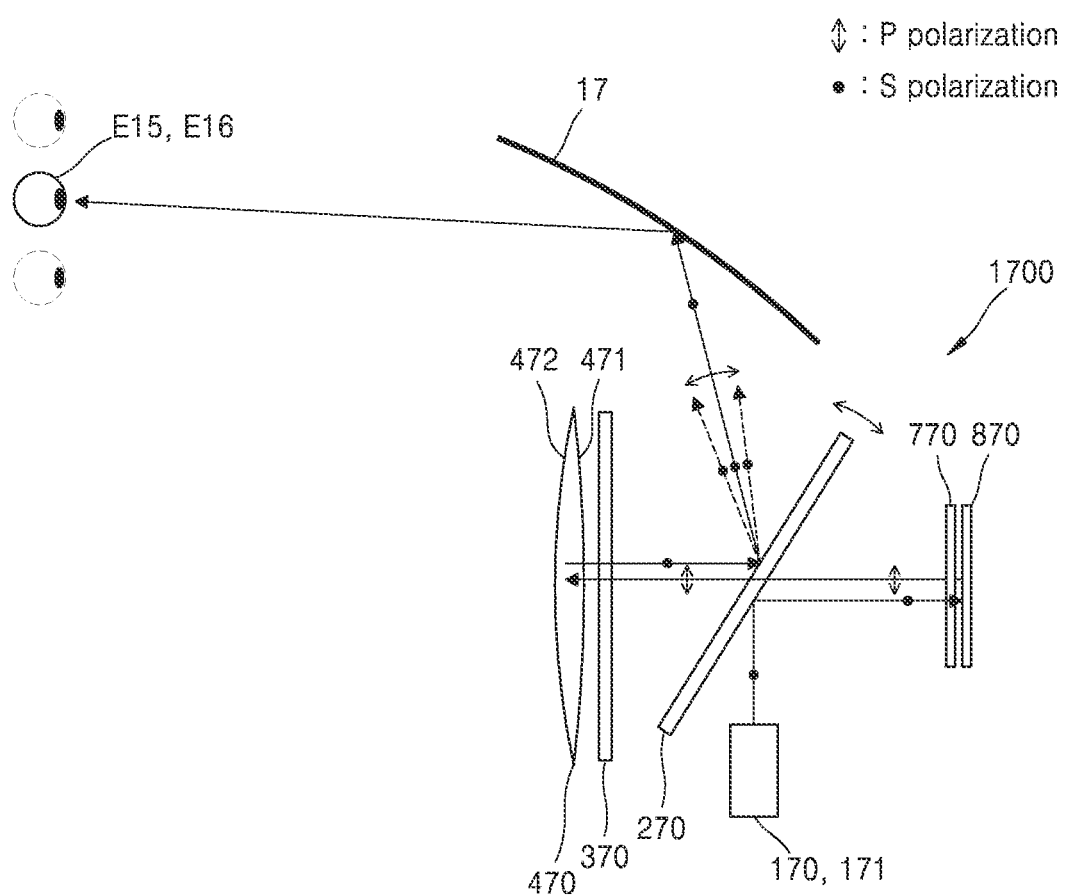
FIG. 11 is a side view schematically showing a configuration of a head-up display system according to another example embodiment.

FIG. 11 is a side view schematically showing a configuration of a head-up display system 1700 according to an example embodiment. The configuration of the head-up display system 1700 of FIG. 11 may be substantially the same as that of the head-up display system 1200 of FIG. 6 except for the convex lens 470 formed integrally with the second mirror 472. In describing FIG. 11, descriptions already given with reference to FIG. 6 will be omitted.

Referring to FIG. 11, the head-up display system 1700 may include: image generating apparatuses 170 and 171 configured to emit light of a first polarization including image information; a first polarization beam splitter 270 provided on an optical path of the light of a first polarization emitted from the image generating apparatuses 170 and 171 and configured to reflect the light of the first polarization; a first wave plate 770 that is provided on the optical path of the light reflected by the first polarization beam splitter 270 and configured to transmit the light reflected by the first polarization beam splitter 270 while converting a phase of the light; a first mirror 870 that is provided on the optical path of the light transmitted by the first wave plate 770 and configured to reflect the light transmitted through the first wave plate 770 back to the first polarization beam splitter 270 through the first wave plate 770; a second wave plate 370 that is provided to be spaced apart from the first wave plate 770 with the first polarization beam splitter 270 therebetween and configured to transmit the light reflected by the first mirror 870 and sequentially passing back through the first wave plate 770 and the first polarization beam splitter 270 while converting a phase of the light; and a second mirror 470 configured to reflect the light sequentially passing through the first polarization beam splitter 270 and the second wave plate 370 back to the first polarization beam splitter 270 through the second wave plate 370. In addition, the head-up display system 1700 may further include a convex lens 470 provided between the second mirror 472 and the wave plate 370 and configured to refract incident light.

The convex lens 470 may be provided on an optical path of light emitted from the image generating apparatuses 170 and 171 and sequentially passing through the first polarization beam splitter 270 and the second wave plate 370. The convex lens 470 may include an incident surface 471 on which the light sequentially passing through the first polarization beam splitter 270 and the second wave plate 370 is incident, and one surface opposite to the incident surface 471. In this case, the second mirror 472 may have a shape corresponding to the shape of the one surface opposite to the incident surface 471 of the convex lens 470, and the second mirror 472 may be formed integrally with the convex lens 470 in contact with the one surface of the convex lens 470. For example, the second mirror 472 may be a concave mirror including a concave surface having a shape corresponding to the shape of the one surface of the convex lens 470. For example, the mirror 472 may be coated and formed in the shape of a thin film on the one surface of the convex lens 470. In this case, the light reflected by the second mirror 472 may be focused on the focal point of the second mirror 472. The light reflected by the second mirror 472 may be refracted by the convex lens 470. Accordingly, the focal length of the second mirror 472 may be shorter, and a configuration including the convex lens 470 may be more advantageous for miniaturization of the head-up display system 1700.

Figure 12:
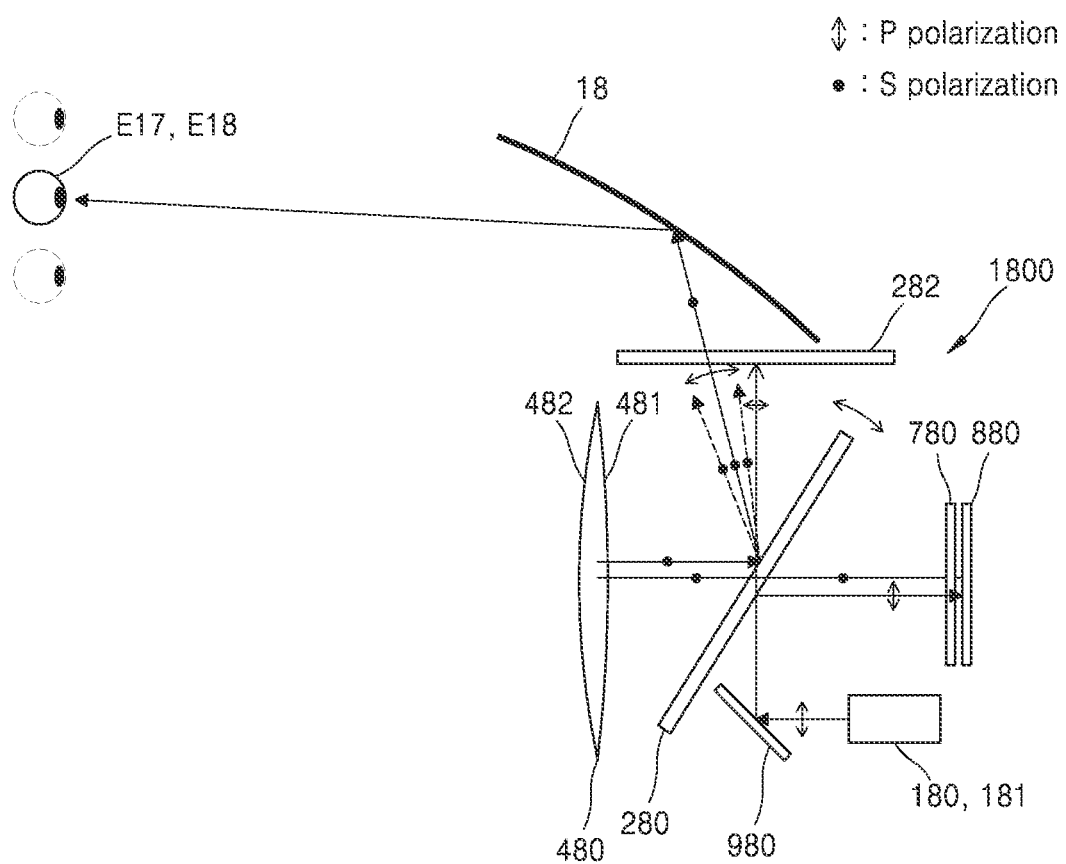
FIG. 12 is a side view schematically showing a configuration of a head-up display system according to another example embodiment.

FIG. 12 is a side view schematically showing a configuration of a head-up display system 1800 according to an example embodiment. The configuration of the head-up display system 1800 of FIG. 12 may be substantially the same as that of the head-up display system 1500 of FIG. 9 except for the convex lens 480 formed integrally with the mirror 482. In describing FIG. 12, descriptions already given with reference to FIG. 9 will be omitted.

Referring to FIG. 12, the head-up display system 1800 may include: image generating apparatus 180 and 181 configured to emit light of a first polarization including image information; a beam splitter 280 provided on an optical path of the light of the first polarization emitted from the image generating apparatus 180 and 181 and configured to reflect a portion of the light of the first polarization in a first direction and transmit the remaining portion of the light of the first polarization in a second direction different from the first direction; a wave plate 780 that is provided on an optical path of the light reflected in the first direction by the beam splitter 280 and configured to transmit the light reflected in the first direction by the beam splitter 280 while converting a phase of the light; a first mirror 880 that is provided on an optical path of the light transmitted through the wave plate 780 and configured to reflect the light transmitted through the wave plate 780 back to the beam splitter 280 through the wave plate 780; a second mirror 482 that is provided to be spaced apart from the first mirror 880 with the beam splitter 280 therebetween and configured to reflect back, toward the beam splitter 280, the light reflected by the first mirror 880 and sequentially passing back through the wave plate 780 and the beam splitter 280. The head-up display system 1800 may further include a convex lens 480 provided between the second mirror 482 and the beam splitter 280 and configured to refract incident light. In addition, the head-up display system 1800 may further include a polarizer 282 configured to block the light of the first polarization transmitted through the beam splitter 280 and traveling in the second direction. For example, the first direction and the second direction may be perpendicular to each other. However, the disclosure is not limited thereto, and the first direction and the second direction may not be parallel to each other. Furthermore, the head-up display system 1800 may further include a third mirror 980 configured to transmit the light from the image generating apparatuses 180 and 181 to the beam splitter 280.

The convex lens 480 may be provided on an optical path of the light reflected by the first mirror 880 and sequentially passing back through the wave plate 780 and the beam splitter 280. The convex lens 480 may include an incident surface 481 on which the light sequentially passing through wave plate 780 and the polarization beam splitter 280 is incident, and one surface opposite to the incident surface 481. In this case, the second mirror 482 may have a shape corresponding to the shape of the one surface opposite to the incident surface 481 of the convex lens 480, and the second mirror 482 may be formed integrally with the convex lens 480 in contact with the one surface of the convex lens 480. For example, the second mirror 482 may be a concave mirror including a concave surface having a shape corresponding to the shape of the one surface of the convex lens 480. For example, the mirror 482 may be coated and formed in the shape of a thin film on the one surface of the convex lens 480. In this case, the light reflected by the second mirror 482 may be focused on the focal point of the second mirror 482. The light reflected by the second mirror 482 may be refracted by the convex lens 480. Accordingly, the focal length of the second mirror 482 may be shorter, and a configuration including the convex lens 480 may be more advantageous for miniaturization of the head-up display system 1800.

Figure 13:
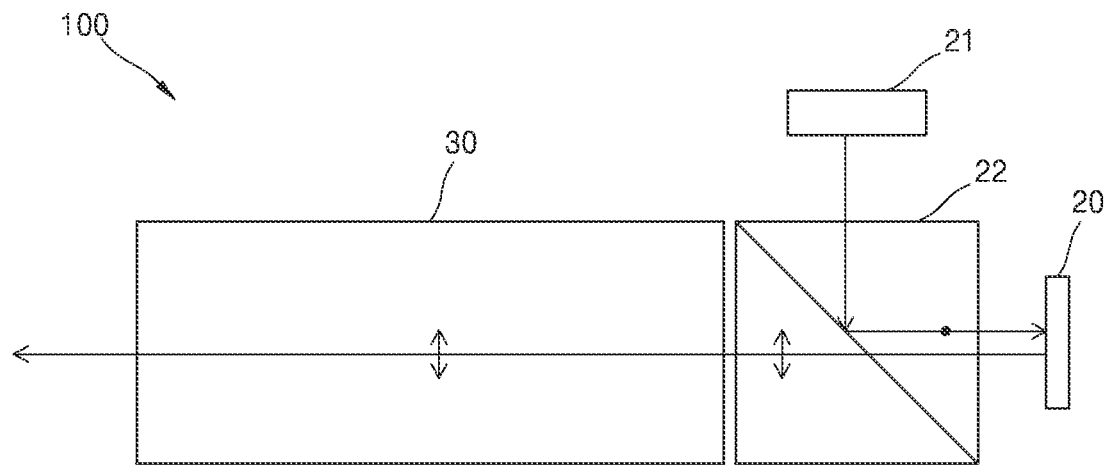
FIG. 13 is a side view schematically showing an example configuration of the first image generating apparatus of FIG. 1.

FIG. 13 is a side view schematically showing an example configuration of the first image generating apparatus 100 of FIG. 1. The example configuration of the first image generating apparatus 100 of FIG. 13 may also be applied to the second image generating apparatus 101 of FIG. 1.

Referring to FIG. 13, the first image generating apparatus 100 may include: a light source 21; a display panel 20 configured to reflect light from the light source 21 and generating light including the image information; a beam splitter 22 that is provided between the light source 21 and the display panel 20 and configured to reflect the light from the light source 21 to provide the reflected light to the display panel 20 and transmit the light from the display panel 20; and an optical system 30 configured to diffuse the light from the display panel 20.

The light source 21 may include an LED element that emits white light. However, the disclosure is not limited thereto, and the light source 21 may include a laser diode configured to emit laser light. In this case, the light emitted from the light source 21 may have coherence. The light source 21 may emit monochromatic light in the visible region. For example, the light source 21 may be an optical element (for example, LED) configured to emit any one of red light, green light, and blue light. Furthermore, the light source 21 may include a plurality of optical elements, and each of the plurality of optical elements may include a first optical element emitting red light, a second optical element emitting green light and a third optical element emitting blue light. The first, second and third optical elements configured to emit light of different wavelengths included in the light source 21 may be driven independently with a time difference. Accordingly, red light, green light, and blue light may be sequentially emitted from the light source 21.

The display panel 20 may convert the light emitted from the light source 21 into light including image information. For example, the display panel 20 may include any one of a liquid crystal on silicon (LCoS), a digital micromirror display (DMD), and a liquid crystal display (LCD) panel. For example, when the display panel 20 is the LCoS or the LCD, The light including the image information generated by the display panel 20 may be light of the first polarization. For example, the first polarization may be horizontal polarization (P polarization). However, embodiments of the present disclosure is not limited thereto, and the first polarization may be vertical polarization (S polarization). For example, when the display panel 20 is the DMD, a separate polarizer configured to convert polarization of light reflected from the display panel 20 may be further included in the first image generating apparatus 100.

The beam splitter 22 may be provided when the display panel 20 is of a reflective type. For example, when the display panel 20 is the LCoS or the DMD, the beam splitter 22 may be provided between the light source 21 and the display panel 20. The beam splitter 22 may include a polarization beam splitter (PBS) configured to transmit or reflect light according to the type of polarization. The beam splitter 22 may include an incident surface inclined at a certain angle with respect to an optical path of the light emitted from the light source 21. At least a portion of the light from the light source 21 is reflected by the incident surface to travel toward the display panel 20. At this time, the light reflected by the incident surface of the beam splitter 22 and directed to the display panel 20 may be, for example, light of vertical polarization (S polarization). For example, when the display panel 20 is the LCoS, the light of vertical polarization (S polarization) directed to the display panel 20 is reflected by the display panel 20 and may be converted into horizontal polarization (P polarization). In addition, when the display panel 20 is the DMD, a separate polarizer configured to convert incident light into horizontal polarization (P polarization) may be provided between the beam splitter 22 and the display panel 20. The light of horizontal polarization (P polarization) from the display panel 20 may be transmitted through the beam splitter 22.

Unlike as shown in FIG. 13, when the display panel 20 is of a transmissive type, the beam splitter 22 may not be included in the first image generating apparatus 100. In this case, the light source 21, the display panel 20 and the optical system 30 may be provided in a straight line.

The display panel 20 may form an image near the display panel 20. The image formed near the display panel 20 may be enlarged through the optical system 30. The optical system 30 may include a plurality of lenses. The image formed by the display panel 20 may be enlarged through a plurality of lenses included in the optical system 30 and formed inside the head-up display system 1000. For example, as illustrated in FIG. 3, the image generated by the display panel 20 may be enlarged through the optical system 30 and formed in the area a1.

Figure 14:
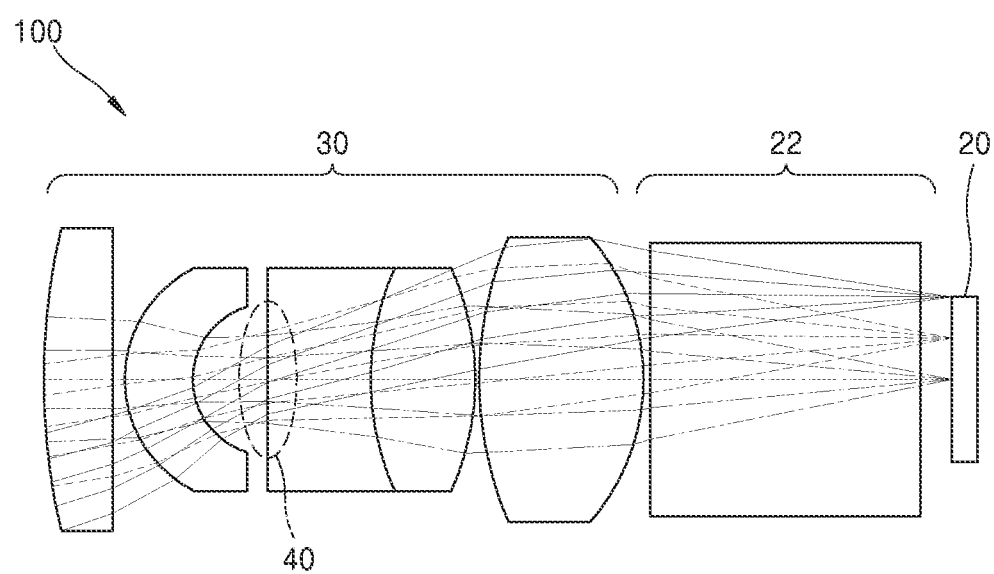
FIG. 14 is a side view showing an example configuration of the first image generating apparatus of FIG. 1.

FIG. 14 is a side view showing an example configuration of the first image generating apparatus 100 of FIG. 1. In FIG. 14, the light source 21 in FIG. 13 is omitted for convenience of description.

Referring to FIG. 14, the light from the display panel 20 may be transmitted through the beam splitter 22 and the optical system 30. For example, the optical system 30 may include a lens group including a plurality of lenses. For example, the lens group included in the optical system 30 may include a projector lens group for forming an image inside the head-up display system 1000. In order to diffuse the light from the display panel 20, the shape of the plurality of lenses may be properly designed. Accordingly, the image by light from the display panel 20 may be enlarged by the plurality of lenses. In addition, an aperture 40 may be provided between the plurality of lenses. The aperture 40 may be configured to block a portion of light emitted from the display panel 20.

Figure 15:
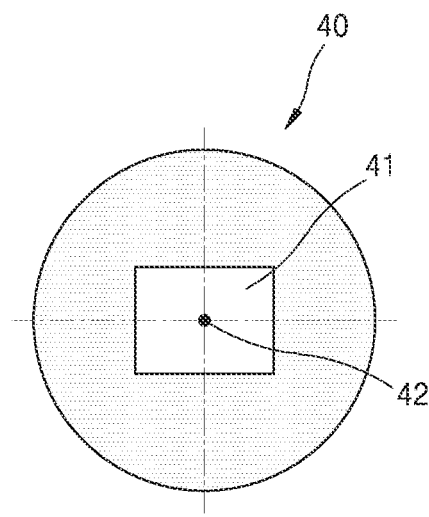
FIG. 15 is a plan view schematically showing an example configuration of an aperture that may be included in the first image generating apparatus of FIG. 14.

FIG. 15 is a plan view schematically showing an example configuration of an aperture 40 that may be included in the first image generating apparatus 100 of FIG. 14.

Referring to FIG. 15, the aperture 40 may be configured to block parallel light emitted from the display panel 20. In other words, only the light that is emitted from a surface of the display panel in a direction perpendicular to the surface may be blocked by the aperture 40. For example, the parallel light emitted from the display panel 20 may be focused to the center of the aperture 40 through a plurality of lenses of the optical system 30. The aperture 40 may have a dot-shaped blocking film 42 configured to block light at the center of the transmission area 41 through which the light from the display panel 20 may be transmitted. The light emitted from the display panel 20 may not be transmitted through the blocking film 42. Accordingly, the aperture 40 may block the light focused and converging to the center of the aperture 40.

Figure 16:
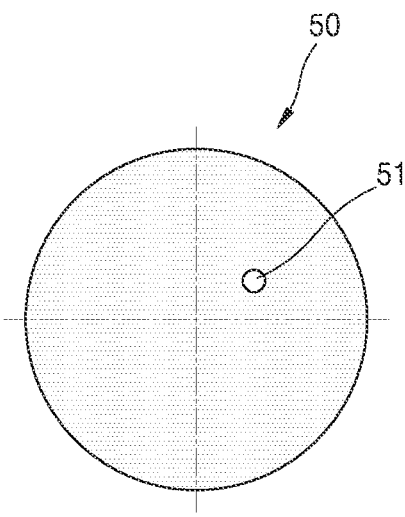
FIG. 16 is a plan view schematically showing an example configuration of an aperture that may be included in the first image generating apparatus of FIG. 14.

FIG. 16 is a plan view schematically showing an example configuration of an aperture 50 that may be included in the first image generating apparatus 100 of FIG. 14.

Referring to FIG. 16, the aperture 50 may be configured to block a portion of the light emitted from the display panel 20. For example, the display panel 20 may generate a computer generated hologram (CGH). In this case, the primary diffracted light emitted from the display panel 20 may be focused to a specific point of the aperture 50 through a plurality of lenses of the optical system 30. The aperture 50 may include an opening 51 provided at a point where the primary diffracted light is focused and converges. Accordingly, from among the light emitted from the display panel 20, only the primary diffracted light may pass through the aperture 50, and the parallel light and high-order diffracted light emitted from the display panel 20 may not pass through the aperture 50.

According to an example embodiment of the disclosure, a miniaturized head-up display system having an increased angle of view and VID may be provided.

According to an example embodiment of the disclosure, it is possible to provide a head-up display system having a structure capable of preventing deterioration of functions due to an increase in temperature of an image generating apparatus.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A head-up display system comprising:
   an image generating apparatus configured to emit light having a first polarization and including image information;
   a polarization beam splitter provided on an optical path of the light having the first polarization emitted by the image generating apparatus, the polarization beam splitter being configured to transmit the light having the first polarization;
   a wave plate configured to transmit the light transmitted through the polarization beam splitter while converting a phase of the light; and
   a mirror configured to reflect the light sequentially transmitted through the polarization beam splitter and the wave plate back to the polarization beam splitter through the wave plate,
   wherein the polarization beam splitter is further configured to reflect light having a second polarization that is different from the first polarization, the light having the second polarization being generated when the light reflected by the mirror is transmitted back to the polarization beam splitter through the wave plate.

2. The head-up display system of claim 1, wherein the mirror comprises a concave mirror.

3. The head-up display system of claim 1 further comprising a convex lens having an incident surface on which the light sequentially transmitted through the polarization beam splitter and the wave plate is incident, the convex lens being provided between the mirror and the wave plate and configured to refract the light incident on the incident surface.

4. The head-up display system of claim 3, wherein a shape of the mirror corresponds to a shape of one surface of the convex lens opposite to the incident surface, and
wherein the mirror is formed integrally with the convex lens and in contact with the one surface of the convex lens.

5. The head-up display system of claim 2, wherein the image generating apparatus is further configured to form an image between the mirror and a focal point of the mirror.

6. The head-up display system of claim 1, wherein the mirror comprises a spherical mirror.

7. The head-up display system of claim 1, wherein the mirror comprises one of an aspherical mirror and a freeform curved mirror.

8. The head-up display system of claim 1, wherein the wave plate comprises a quarter wave plate.

9. The head-up display system of claim 1, wherein a polarization axis of the first polarization and a polarization axis of the second polarization are perpendicular to each other.

10. The head-up display system of claim 1, wherein the polarization beam splitter is rotatable.

11. The head-up display system of claim 1, wherein the image generating apparatus comprises:
a first image generating apparatus configured to generate a left eye image; and
a second image generating apparatus configured to generate a right eye image.

12. The head-up display system of claim 1 further comprising a sensor configured to track a position of eyes of a user.

13. The head-up display system of claim 12 further comprising a processor configured to control movement of the image generating apparatus based on the position of the eyes of the user obtained by the sensor.

14. A head-up display system comprising:
an image generating apparatus configured to emit light having a first polarization and including image information;
a first polarization beam splitter provided on an optical path of the light having the first polarization and configured to reflect the light having the first polarization;
a first wave plate configured to transmit the light reflected by the first polarization beam splitter while converting a phase of the light;
a first mirror configured to reflect the light transmitted through the first wave plate back to the first polarization beam splitter through the first wave plate;
a second wave plate spaced apart from the first wave plate with the first polarization beam splitter therebetween, the second wave plate being configured to transmit the light reflected by the first mirror and sequentially transmitted through the first wave plate and the first polarization beam splitter while converting the phase of the light; and
a second mirror configured to reflect the light sequentially transmitted through the first polarization beam splitter and the second wave plate back to the first polarization beam splitter through the second wave plate,
wherein the first polarization beam splitter is further configured to reflect the light reflected by the second mirror and transmitted back through the second wave plate.

15. The head-up display system of claim 14, wherein the second mirror comprises a concave mirror.

16. The head-up display system of claim 14 further comprising a convex lens having an incident surface on which the light sequentially transmitted through the first polarization beam splitter and the second wave plate is incident, the convex lens being provided between the second mirror and the second wave plate and configured to refract the light incident on the incident surface.

17. The head-up display system of claim 16, wherein the second mirror has a shape corresponding to a shape of one surface of the convex lens opposite to the incident surface, and
wherein the second mirror is formed integrally with the convex lens and in contact with the one surface of the convex lens.

18. The head-up display system of claim 15, wherein the image generating apparatus is further configured to form an image between the second mirror and a focal point of the second mirror.

19. The head-up display system of claim 14, wherein the light reflected by the first mirror and then transmitted back to the first polarization beam splitter through the first wave plate includes light having a second polarization that is different from the first polarization, and
wherein the light reflected by the second mirror and then transmitted back to the first polarization beam splitter through the second wave plate includes the light having the first polarization.

20. The head-up display system of claim 14, wherein the first wave plate comprises a first quarter wave plate, and the second wave plate comprises a second quarter wave plate.

21. The head-up display system of claim 14 further comprising a third mirror configured to reflect the light emitted by the image generating apparatus to the first polarization beam splitter.

22. The head-up display system of claim 14 further comprising a second polarization beam splitter that is provided between the first polarization beam splitter and the first wave plate, the second polarization beam splitter being configured to reflect the light emitted by the image generating apparatus to the first wave plate.

23. The head-up display system of claim 22, wherein the first polarization beam splitter is rotatable, and the second polarization beam splitter is fixed.

24. A head-up display system comprising:
an image generating apparatus configured to emit light having a first polarization and including image information;
a beam splitter provided on an optical path of the light having the first polarization, the beam splitter being configured to reflect a portion of the light having the first polarization in a first direction and transmit the remaining portion of the light having the first polarization in a second direction that is different from the first direction;
a wave plate configured to transmit the light reflected in the first direction by the beam splitter while changing a phase of the light;
a first mirror configured to reflect the light transmitted through the wave plate back to the beam splitter through the wave plate;
a second mirror spaced apart from the first mirror with the beam splitter therebetween, the second mirror being configured to reflect back, toward the beam splitter, the light reflected by the first mirror and sequentially transmitted through the wave plate and the beam splitter; and a polarizer configured to block the light having the first polarization transmitted through the beam splitter and traveling in the second direction, wherein the beam splitter is configured to reflect the light reflected by the second mirror, and wherein the polarizer is configured to transmit the light sequentially reflected by the second mirror and the beam splitter.

25. The head-up display system of claim 24, wherein the second mirror comprises a concave mirror.

26. The head-up display system of claim 24 further comprising a convex lens having an incident surface on which the light sequentially transmitted through the wave plate and the beam splitter is incident, the convex lens being provided between the second mirror and the wave plate and configured to refract the light incident on the incident surface.

27. The head-up display system of claim 26, wherein a shape of the second mirror corresponds to a shape of one surface of the convex lens opposite to the incident surface, and wherein the second mirror is formed integrally with the convex lens and in contact with the one surface of the convex lens.

28. The head-up display system of claim 1, wherein the image generating apparatus comprises:

a display panel configured to generate the light including the image information; and an optical system configured to diffuse the light generated from the display panel.

29. The head-up display system of claim 28, wherein the display panel comprises one of a liquid crystal on silicon (LCoS), a digital micromirror display (DMD) and a liquid crystal display (LCD) panel.

30. The head-up display system of claim 28, wherein the optical system comprises a plurality of lenses.

31. The head-up display system of claim 30, wherein the optical system further comprises an aperture provided between a first lens and a second lens of the plurality of lenses, the aperture being configured to block a portion of the light emitted from the display panel.

32. The head-up display system of claim 31, wherein the aperture is configured to block light emitted from a surface of the display panel in a direction perpendicular to the surface of the display panel.

33. The head-up display system of claim 32, wherein the aperture comprises a dot-shaped blocking film at a center thereof, the dot-shaped blocking film being configured to block light converging to the center of the aperture from the plurality of lenses.

34. The head-up display system of claim 28, wherein the display panel is further configured to generate a computer generated hologram (CGH).

35. The head-up display system of claim 34, wherein the optical system further comprises:

a plurality of lenses; and an aperture provided between a first lens and a second lens of the plurality of lenses, the aperture being configured to block a portion of the light emitted from the display panel, wherein the aperture includes an opening provided at a point where primary diffracted light from among light emitted from the display panel converges from the plurality of lenses.

* * * * *